United States Patent [19]
Argyropoulos et al.

[11] Patent Number: 5,362,519
[45] Date of Patent: Nov. 8, 1994

[54] POLYESTERS PARTICULARLY SUITABLE FOR USE IN COATING COMPOSITIONS WHICH ARE SPRAYED WITH COMPRESSED FLUIDS AS VICOSITY REDUCING AGENTS

[75] Inventors: John N. Argyropoulos, Scott Depot; Cheryl C. Bone, Saint Albans; Charles W. Glancy, South Charleston, all of W. Va.

[73] Assignee: Union Carbide Chemicals & Plastics Technology Corporation, Danbury, Conn.

[21] Appl. No.: 92,541

[22] Filed: Jul. 16, 1993

Related U.S. Application Data

[63] Continuation of Ser. No. 790,895, Nov. 12, 1991, abandoned.

[51] Int. Cl.⁵ ............................................. B05D 3/02
[52] U.S. Cl. ........................... 427/385.5; 528/272; 528/302; 528/303; 528/308; 528/308.6; 528/483; 528/489; 528/490; 525/437; 525/444; 524/429; 524/500; 524/539; 524/601; 427/421; 427/426; 428/480
[58] Field of Search ............... 528/272, 302, 303, 308, 528/308.6, 483, 489, 490; 525/437, 444; 524/429, 500, 539, 601; 427/385.5, 421, 426; 428/480

[56] References Cited

U.S. PATENT DOCUMENTS

| | | | |
|---|---|---|---|
| 2,600,275 | 6/1952 | Smith | 568/680 |
| 4,582,731 | 4/1986 | Smith | 427/421 |
| 4,734,227 | 3/1988 | Smith | 264/13 |
| 4,734,451 | 3/1988 | Smith | 524/493 |
| 4,923,720 | 5/1990 | Lee et al. | 427/422 |
| 5,009,367 | 4/1991 | Nielsen | 239/3 |
| 5,027,742 | 7/1991 | Lee et al. | 118/300 |

Primary Examiner—John Kight, III
Assistant Examiner—Sam A. Acquah
Attorney, Agent, or Firm—G. L. Coon

[57] ABSTRACT

The present invention relates to polyesters which are particularly suitable in coating compositions which are sprayed with compressed fluids which act as viscosity reducing diluents.

14 Claims, 2 Drawing Sheets

POLYESTERS PARTICULARLY SUITABLE FOR USE IN COATING COMPOSITIONS WHICH ARE SPRAYED WITH COMPRESSED FLUIDS AS VICOSITY REDUCING AGENTS

This application is a continuation of prior U.S. application Ser. No. 07/790,895, filed Nov. 12, 1991, now abandoned

RELATED PATENT APPLICATIONS

This application contains subject matter related to commonly assigned U.S Pat. No. 4,923,720, issued May 8, 1990, U.S. patent application Ser. No. 413,517, filed Sep. 27, 1989, and U.S. patent application Ser. No. 631,680, filed Dec. 21, 1990, all of which are incorporated herein by reference, as if set out in full. Moreover, the following related, commonly assigned applications, all filed on even date herewith, are also all incorporated herein by reference, as if set out in full: U.S. patent application Ser. No. (790,875); U.S. patent application Ser. No. (790,872); U.S. patent application Ser. No. (790,873); U.S. patent application Ser. No. (790,896); and U.S. patent application Ser. No. (790,874).

FIELD OF THE INVENTION

This invention, in general, pertains to the field of coating compositions. More specifically, the present invention relates to polyesters which are particularly suitable in coating compositions which are sprayed with compressed fluids which act as viscosity reducing diluents.

BACKGROUND OF THE INVENTION

Prior to the invention described in U.S Pat. No. 4,923,720, the liquid spray application of coatings, such as paints, lacquers, enamels and varnishes, was effected solely through the use of organic solvents as viscosity reduction diluents. However, because of increased environmental concern, efforts have been directed to reducing the pollution resulting from painting and finishing operations. For this reason, there has been a great deal of emphasis placed on the development of new coatings technologies which diminish the emission of organic solvent vapors.

A number of technologies have emerged as having met most but not all of the performance and application requirements, and at the same time meeting emission requirements and regulations. They are: (a) powder coatings, (b) water-borne dispersions, (c) non-aqueous dispersions, and (d) high solids coatings. Each of these technologies has been employed in certain applications and each has found a niche in a particular industry. However, at the present time, none has provided the performance and application properties that were initially expected.

Powder coatings, for example, while providing ultra low emission of organic vapors, are generally characterized as having poor gloss or good gloss with heavy orange peel, poor distinctness of image gloss (DOI), and poor film uniformity. Moreover, to obtain even these limited performance properties generally requires excessive film thickness and/or high curing temperatures. Pigmentation of powder coatings is often difficult, requiring at times milling and extrusion of the polymer-pigment composite mixture followed by cryogenic grinding. In addition, changing colors of the coating often requires its complete cleaning, because of dust contamination of the application equipment and finishing area.

Water-borne coatings, on the other hand, are very difficult to apply under conditions of high relative humidity without serious coating defects. There defects result from the fact that under conditions of high humidity, water evaporates more slowly than the organic cosolvents of the coalescing aid, and as might be expected in the case of aqueous dispersions, the loss of the organic cosolvent/coalescing aid interferes with film formation. Poor gloss, poor uniformity, and pin holes unfortunately often result. Additionally, water-borne coatings are not as resistant to corrosive environments as are more conventional solvent-borne coatings.

Coatings applied with organic solvents at high solids levels avoid many of the pitfalls of powder and water-borne coatings. However, in these systems, the molecular weight of the polymer has been decreased and reactive functionality has been incorporated therein so that further polymerization and crosslinking can take place after the coating has been applied. It has been hoped that this type of coating will meet the ever-increasing regulatory requirements and yet meet the most exacting coatings performance demands. However, there is a limit as to the ability of this technology to meet the performance requirements of a commercial coating operation. Present high solids systems have difficulty in application to vertical surfaces without running and sagging of the coating. If they possess good reactivity, they often have poor shelf and pot life. However, if they have adequate shelf stability, they cure and/or crosslink slowly or require high temperature to effect an adequate coating on the substrate.

Clearly, what was needed was an environmentally safe, non-polluting diluent that can be used to thin very highly viscous polymer and coatings compositions to liquid spray application consistency. Such a diluent would allow utilization of the best aspects of organic solvent-borne coatings applications and performance while reducing the environmental concerns to an acceptable level. Such a coating system could meet the requirements of shop-applied and field-applied liquid spray coatings as well as factory-applied finishes and still be in compliance with environmental regulations.

Such a needed diluent was indeed found and is discussed in the aforementioned related patent which teaches, among other things, the utilization of supercritical fluids, such as supercritical carbon dioxide fluid, as diluents in highly viscous organic solvent-borne and/or highly viscous non-aqueous dispersions coatings compositions to dilute these compositions to application viscosity required for liquid spray techniques. In related U.S. patent application Ser. No. 631,680, it has been further discovered that the viscosity reduction effect may also be obtained with a subcritical compressed fluid, which fluid is a gas at standard conditions of 0° C. and one atmosphere pressure.

As used herein, it will be understood that a "supercritical fluid" is a material which is at a temperature and pressure such that it is at, above, or slightly below its "critical point". As used herein, the "critical point" is the transition point at which the liquid and gaseous states of a substance merge into each other and represents the combination of the critical temperature and critical pressure for a given substance. The "critical temperature", as used herein, is defined as the temperature above which a gas cannot be liquified by an increase in pressure. The "critical pressure", as used herein, is defined as that pressure which is just sufficient to cause the appearance of two phases at the critical temperature.

Also as used herein, it will be understood that a "subcritical fluid" is a material which is at a temperature and/or pressure such that it is below its critical point. Such a subcritical fluid may be (i) below its critical temperature while being above its critical pressure, or (ii) below its critical pressure while being above its critical temperature, or (iii) below both its critical temperature and critical pressure.

As used herein, a "compressed fluid" is a supercritical fluid or, alternatively, a subcritical fluid which may be in its gaseous state, its liquid state, or a combination thereof depending upon the particular temperature and pressure to which it is subjected upon admixture with the composition which is to have its viscosity reduced and the vapor pressure of the fluid at that particular temperature, but which is in its gaseous state at standard conditions of 0° C. and one atompsphere (STP).

Also as used herein, the phrases "coating composition" and "coating formulation" are understood to mean conventional coating formulations, that may or may not contain the polyester resins featured in the present invention, having no compressed fluid admixed therewith. The phrases "liquid mixture", "spray mixture", and "admixed coating composition" are meant to include an admixture of a coating composition or coating formulation with at least one compressed fluid.

With the objective of trying to diminish the emission of organic solvent vapors in mind so as to reduce pollution, it should be readily apparent that it would be highly desirable to replace as much of the organic solvent in a coating formulation as possible with the compressed fluids acting as viscosity reducing diluents. However, there is a limit as to the amount of compressed fluid that may be added to any given coating formulation. This limit is dicated by the miscibility characteristics of the compressed fluid with the coating formulation. If the compressed fluid is added much beyond such miscibility limit, a two phase separation results which may not be desirable for purposes of spraying and proper coating formation. Accordingly, it would be beneficial if a coating formulation, and particularly a polymer resin for such coating formulation, be available which has a higher miscibility with the compressed fluids.

So too, it would also be desirable to have a coating formulation, particularly a polymer resin, which posseses a relatively low viscosity. This would enable the utilization of a higher solids content within the coating formulation and a correspondingly lower amount of volatile organic solvents.

Clearly, a need exists to be able to accomplish these objectives. Preferably, these objectives are met while at the same time providing finished coatings which are equal to, if not better, than existing coatings with respect to the properties that they exhibit.

The present invention fills those needs by providing polyester compositions from which coating formulations may be made which have relatively low viscosities, have relatively high compatibility with compressed fluids, particularly compressed carbon dioxide, and which moreover provide coatings having an exceptional balance of properties, particularly high gloss, impact resistance, and water resistance.

SUMMARY OF THE INVENTION

By virtue of the present invention, the above needs have now been met by the use of polyester compositions which are prepared from hydrocarbon diols and polyfunctional carboxylic acids and/or acid anhydrides. These polyesters of various molecular weights and/or viscosities can be prepared from liquid diols and polyfunctional carboxylic acids or acid anhydrides. The liquid diols are comprised of primary hydroxyl groups and 8 or more carbon atoms in which the primary hydroxyl groups are separated by 4 or more carbon atoms linearly arranged and in which at least one of said carbon atoms linearly arranged is a disubstituted carbon atom or at least 2 of said carbon atoms linearly arranged are monosubstituted carbon atoms, said liquid diol existing as a liquid at a temperature of 35° C. or less. For unsaturated polyesters, the liquid diol is other than 2,4-diethyl-3-propyl-1,5-pentanediol.

These polyesters have improved water, acid, and other chemical resistance over those presently known and therefore are highly desirable for the preparation of hydrolytic resistant coatings, inks, adhesives, and sealants. These polyesters also enable the use of higher solids coating formulations with balanced properties and low temperature cure characteristics. These polyesters are particularly beneficial in forming acid resistant coatings. Such coatings are useful as automotive clear coatings that are used to cover color coats in what is known as clear coat/color coat systems as well as in other end uses including outdoor signs, functional and decorative coatings for metal and plastics, as for example in outdoor signs, coatings for electronic parts, and similar end uses.

More specifically, in its broadest embodiment, the present invention is directed to a process for reducing the viscosity of a composition containing one or more polyesters comprising forming a liquid mixture in a closed system comprising:

a) a composition containing at least one or more polyesters comprising the reaction product of (i) a liquid hydrocarbon diol comprised of primary hydroxyl groups and 8 or more carbon atoms in which the primary hydroxyl groups are separated by 4 or more carbon atoms linearly arranged and in which at least one of said carbon atoms linearly arranged is a disubstituted carbon atom or at least 2 of said carbon atoms linearly arranged are monosubstituted carbon atoms, said liquid hydrocarbon diol existing as a liquid at a temperature of 35° C. or less, and/or a derivative of said liquid hydrocarbon diol, provided when said polyester is an unsaturated polyester, then said liquid hydrocarbon diol is other than 2,4-diethyl-3-propyl-1,5-pentanediol, and (ii) a polyfunctional carboxylic acid and/or an acid anhydride; and b) at least one compressed fluid in at least an amount which when added to (a) is sufficient to render the viscosity of said mixture to a point suitable for being transportable, wherein the compressed fluid is a gas at standard conditions of 0° C. and one atomsphere (STP).

As used herein, the term "transportable[ is meant to provide the liquid mixture with a viscosity such that it is capable of being fasciley conveyed from one point to another by any means, such as by pumping, passing through a pipe or a conduit, passing through an orifice, being able to be sprayed, and the like. It is not meant to merely take the liquid mixture and place it in a container such that the conveyance of the container makes the liquid mixture transportable.

In a more preferred embodiment of the present invention, a process for the liquid spray application of coatings to a substrate containing one or more polyesters is disclosed, which process comprises:

a) forming a liquid mixture in a closed system, said liquid mixture comprising:

i) at least one or more polyesters comprising the reaction product of (i) a liquid hydrocarbon diol comprised of primary hydroxyl groups and 8 or more carbon atoms in which the primary hydroxyl groups are separated by 4 or more carbon atoms linearly arranged and in which at least one of said carbon atoms linearly arranged is a disubstituted carbon atom or at least 2 of said carbon atoms linearly arranged are monosubstituted carbon atoms, said liquid hydrocarbon diol existing as a liquid at a temperature of 35° C. or less, and/or a derivative of said liquid hydrocarbon diol, provided when said polyester is an unsaturated polyester, then said liquid hydrocarbon diol is other than 2,4-diethyl-3-propyl-1,5-pentanediol, and (ii) a polyfunctional carboxylic acid and/or an acid anhydride; and ii) at least one compressed fluid in at least an amount which when added to (i) is sufficient to render the viscosity of said mixture to a point suitable for spray application, wherein the compressed fluid is a gas at standard conditions of 0° C. and one atmosphere (STP); and b) spraying said liquid mixture onto a substrate to form a liquid coating thereon.

In preferred embodiments of the present invention, the compressed fluid, whether it be in the supercritical or subcritical state is carbon dioxide.

DETAILED DESCRIPTION OF THE INVENTION

Figure 1:
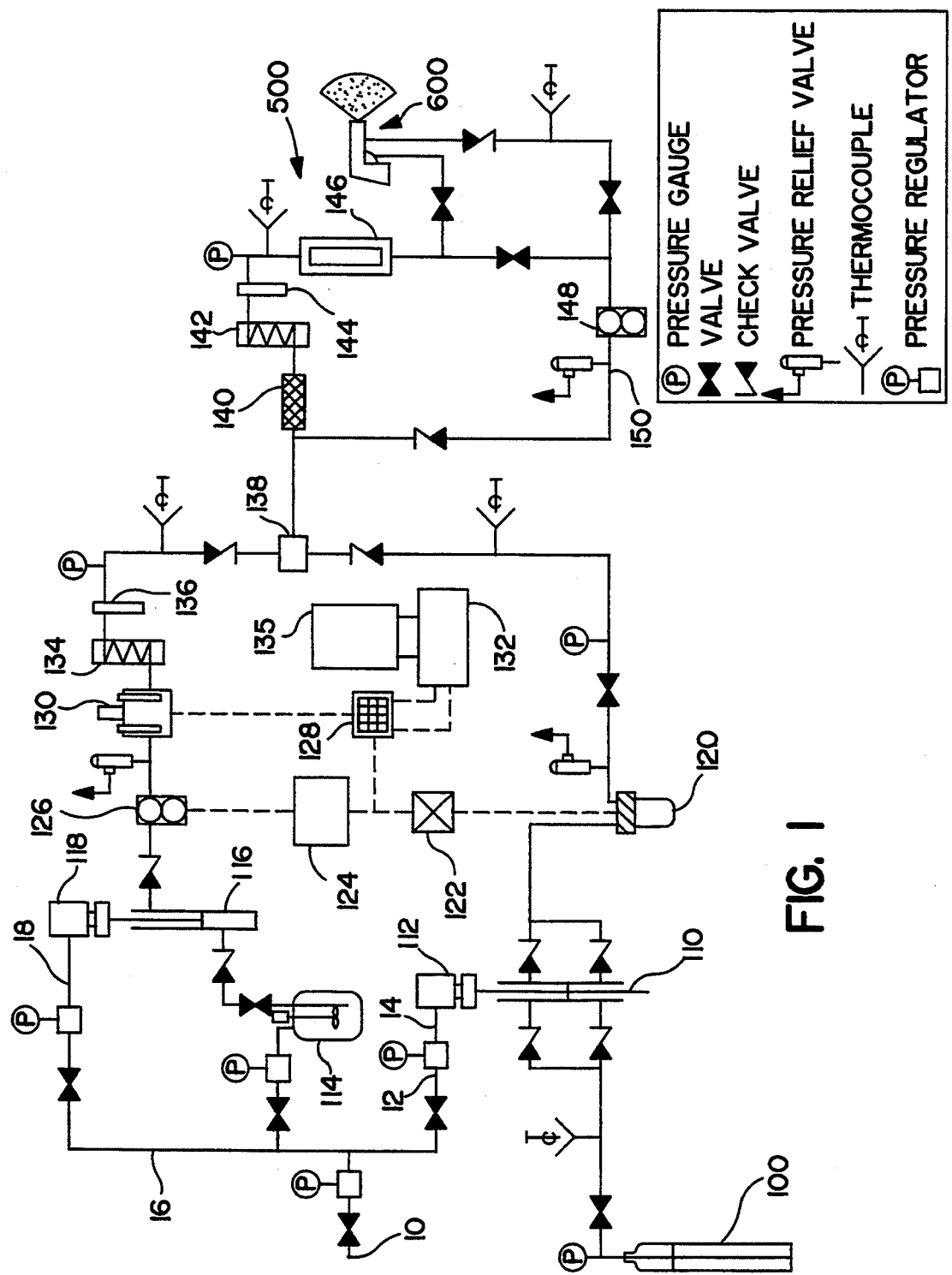
FIG. 1 is a schematic diagram of an embodiment of the present invention in which an accurately proportioned mixture of subcritical compressed carbon dioxide and coating formulation containing the featured polyesters of the present invention is formed in preparation for spraying.

The present invention is directed to the use of unique polyesters, particularly forming transportable compositions which contain such polyesters and/or applying such polyesters as coatings upon substrates using compressed fluids as viscosity reduction diluents, wherein such compressed fluids are in the gaseous state at 0° C. and one atmosphere pressure (STP). The present invention is not narrowly critical to the type of coating composition that can be made transportable and, if desired, sprayed as a liquid coating. Essentially any coating composition containing at least one or more of the polyesters featured in the present invention having conventional coating constituents such as surface active agents, thickeners, reactive diluents, etc. which is typically sprayed with an airless spray technique may also be sprayed by means of the embodiments of the present invention.

Generally, such coating compositions typically include a solids fraction containing at least one component which is capable of forming a coating on a substrate. Typically, at least one such solids fraction component is a polymeric component which are well known to those skilled in the art. In the present invention, at least one such polymeric component is a polyester resin which is prepared by condensing a liquid diol comprised of primary hydroxyl groups and 8 or more carbon atoms in which the primary hydroxyl groups are separated by 4 or more carbon atoms linearly arranged and in which at least one of said carbon atoms linearly arranged is a disubstituted carbon atom or at least 2 of said carbon atoms linearly arranged are monosubstituted carbon atoms, said liquid diol existing as a liquid at a temperature of 35° C. or less, with a polyfunctional carboxylic acid or an acid anhydride to form an essentially hydroxyl-terminated polyester product.

The preferred liquid hydrocarbon diols for use in this invention are represented by the formula:

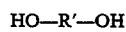

HO—R'—OH wherein R' is a substituted hydrocarbon residue having 8 or more carbon atoms in which the primary hydroxyl groups are separated by 4 or more carbon atoms linearly arranged and in which at least one of said carbon atoms linearly arranged is a disubstituted carbon atom or at least 2 of said carbon atoms linearly arranged are monosubstituted carbon atoms, said liquid hydrocarbon diol existing as a liquid at a temperature of 35° C. or less.

Other preferred liquid hydrocarbon diols for use in this invention are represented by the formula:

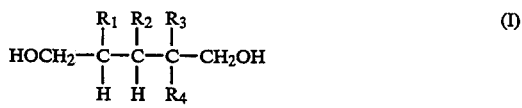

$$HOCH_2-\underset{\underset{H}{|}}{\overset{\overset{R_1}{|}}{C}}-\underset{\underset{H}{|}}{\overset{\overset{R_2}{|}}{C}}-\underset{\underset{R_4}{|}}{\overset{\overset{R_3}{|}}{C}}-CH_2OH \qquad (I)$$

wherein $R_1$ is hydrogen or linear or branched alkyl having from 1 to 3 carbon atoms, and RI, $R_3$ and $R_4$ are the same or different and are hydrogen or linear or branched alkyl having from 1 to 4 carbon atoms, said liquid hydrocarbon diol existing as a liquid at a temperature of 35° C. or less; provided (a) at least 2 of $R_1$, $R_2$, $R_3$ and $R_4$ are other than hydrogen; (b) the total number of carbon atoms in $R_1$, $R_2$, $R_3$ and $R_4$ together is 5 or more except as follows: (i) when $R_2$ is ethyl and one of $R_1$, $R_3$ and $R_4$ is methyl, then the remaining 2 of $R_1$, $R_3$ and $R_4$ can be hydrogen; (ii) when $R_3$ and $R_4$ are independently methyl and propyl, then $R_1$ and $R_2$ can be hydrogen; and (iii) when $R_1$ is methyl and $R_2$ is ethyl and one of $R_3$ and $R_4$ is methyl, then the remaining $R_3$ or $R_4$ can be hydrogen; (c) when the total number of carbon atoms in $R_1$ and $R_2$ is 4 or more, then the total number of carbon atoms in $R_2$ is 3 or less except when $R_1$ is propyl and $R_3$ and $R_4$ are hydrogen, then $R_2$ can be butyl; and (d) when $R_1$ is ethyl and $R_2$ is propyl, then $R_3$ is other than ethyl.

The liquid hydrocarbon diols useful in this invention, for example, the liquid 1,5-pentanediols represented by Formula I above, can be prepared by a process comprising:

(a) contacting a substituted vinyl ether with a substituted or unsubstituted acrolein to form a substituted 3,4-dihydropyran;

(b) contacting the substituted 3,4-dihydropyran with an acid catalyst to form a substituted dialdehyde; and (c) hydrogenating the substituted dialdehyde in the presence of a catalyst to form a liquid hydrocarbon diol represented by Formula I above.

More particularly, the liquid 1,5-pentanediols represented by Formula I above can be prepared by reacting acrolein or substituted acrolein with a substituted vinyl ether as follows:

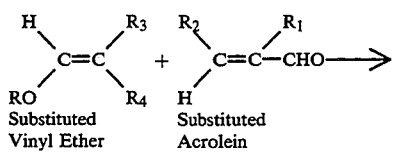
Substituted Vinyl Ether + Substituted Acrolein →

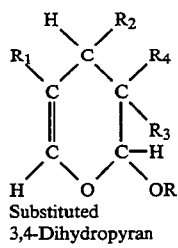
Substituted 3,4-Dihydropyran

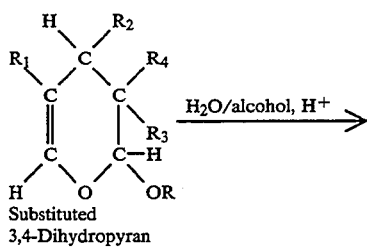 H₂O/alcohol, H⁺ →
Substituted 3,4-Dihydropyran

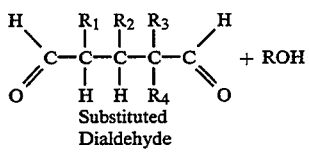 + ROH
Substituted Dialdehyde

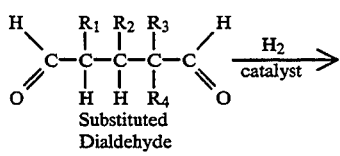 H₂/catalyst →
Substituted Dialdehyde

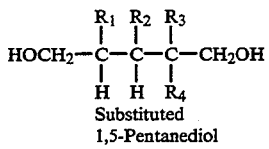
Substituted 1,5-Pentanediol wherein R₁, R₂, R₃ and R₄ are as defined above and R is a substituted or unsubstituted hydrocarbon residue, preferably a linear or branched alkyl having from 1 to about 8 carbon atoms.

Illustrative of suitable substituted vinyl ethers useful in preparing the liquid hydrocarbon diols include, among other, alkyl vinyl ethers such as methyl vinyl ether; methyl (2-methyl vinyl) ether which has the structure:

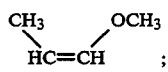 ;

methyl (2-ethyl vinyl) ether, which has the structure:

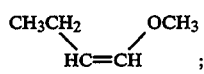 ;

methyl (2,2-dimethyl vinyl) ether; methyl (2-methyl, 2-propyl vinyl) ether; methyl (2-butyl, 2-methyl vinyl) ether; ethyl vinyl ether; ethyl (2-methyl vinyl); ethyl (2-ethyl vinyl) ether; ethyl (2,2-dimethyl vinyl) ether; ethyl (2-methyl, 2-propyl vinyl) ether; ethyl (2-butyl, 2-methyl vinyl) ether; n-propyl and i-propyl vinyl ethers; butyl vinyl ethers such as n-butyl vinyl ether, s-butyl vinyl ether, i-butyl vinyl ether, and t-butyl vinyl ether; amyl vinyl ethers, and the like; divinyl ethers such as triethylene glycol divinyl ether, 1,4-cyclohexane dimethanol divinyl ether, trivinyl ethers, and the like. It is preferred that alkyl vinyl ethers with up to 3 carbon alkyl groups and one- to three-carbon alkyl (alkyl vinyl) ether s with alkyl vinyl groups of up to 8 carbon atoms are used.

Illustrative of suitable acroleins useful in preparing the liquid hydrocarbon diols include, among others, acrolein; 2-ethyl-2-butenal; 2-methyl-2-butenal; 2-(n-propyl)-2-butenal; 2-(i-propyl)-2-butenal; 2-methyl-2-pentenal, which has the structure:

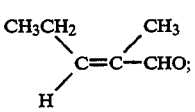

2-ethyl-2-pentenal; 2-(n-propyl)-2-pentenal; 2-(i-propyl)-2-pentenal; 2-(n-butyl)-pentenal; 2-(i-butyl)-pentenal; 2-(s-butyl)-pentenal; 2-(t-butyl)-pentenal; 2-amyl pentenals; 2-ethyl-2-hexenal, which has the structure:

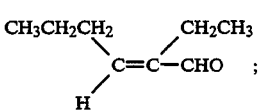 ;

2-methyl-2-hexenals; 2-(n-propyl)-2-hexenals; 2-(i-propyl)-2-hexenals; 2-(n-butyl)-2-hexenals; 2-(i-butyl)-2-hexenals; 2-(s-butyl)-2-hexenals; 2-(t-butyl)-2-hexenals; 2-amyl hexenals; and the like.

Illustrative of suitable substituted 3,4-dihydropyrans prepared in re action step (a) above include, for example, 2-alkoxy-5-ethyl-4-propyl-3,4-dihydro-1,2-pyran, 2-alkoxy-4-ethyl -5 -methyl-3,4-dihydro-1,2-pyran, 2-alkoxy-4-ethyl -3,5-dimethyl-3,4-dihydro-1,2-pyran, 2-alkoxy -5-ethyl-3-methyl-4-propyl-3,4-dihydro-1,2-pyran, 2- alkoxy-3,4-diethyl-5-methyl-3,4-dihydro-1,2-pyran, 2- alkoxy-4-ethyl-3,3′,5-trimethyl-3,4-dihydro -1,2-pyran, 2-alkoxy-3,3′-dimethyl-4-propyl-3,4-dihydro-1,2-pyran, 2-alkoxy-3-methyl-3′-propyl-3,4-dihydro-1,2-pyran, 2-alkoxy-4-ethyl-5-methyl-3-methyl-3′-propyl-3,4-dihydro-1,2-pyran, 2-alkoxy -5-ethyl-3-methyl-3′,4-dipropyl-3,4-dihydro-1,2-pyran, 2-alkoxy-3-butyl-3′-ethyl-3,4-dihydro-1,2-pyran, 2-alkoxy-3-butyl-3′,4-diethyl-5-methyl-3,4-dihydro -1,2-pyran, 2-alkoxy-3-butyl-3′,5-diethyl-4-propyl -3,4-dihydro-1,2-pyran, and the like. For purposes of these illustrative substituted 3,4-dihydropyrans, alkoxy refers to methoxy, ethoxy, n-propoxy, isopropoxy, n-butoxy, i-butoxy, s-butoxy, t-butoxy, and the like.

The step (a) reaction can be conducted at a temperature of from about 160° C. to 280° C. for a period of about 1 hour to about 7 days with the longer time being used at the lower temperature, preferably from about 180° C. to about 270° C. for about 1 hour to about 5 days, and more preferably at about 200° C. to 260° C. for about 1 hour to about 48 hours. During the reaction, from less than 0.01 percent by weight to about 5 percent by weight of the total weight of the starting materials, preferably from about 0.01 percent by weight to about 2 percent by weight, of a free radical inhibitor can be added to the reaction mass. Illustrative of such free radical inhibitors are 2,6-ditertiarybutyl-4-methyl phenol, hydroquinone, hydroquinone monomethyl ether, and the like. A particularly useful inhibitor is hydroguinone.

The step (a) reaction can be conducted over a wide range of pressures ranging from atmospheric pressure to superatmospheric pressures, e.g., from about 1 atmosphere to about 100 atmospheres or greater. It is preferable to conduct the step (a) reaction at pressures of from about atmospheric to about 25 atmospheres. The step (a) reaction is preferably effected in the liquid or vapor states or mixtures thereof.

The molar ratio of substituted vinyl ether to acrolein compound in the step (a) reaction is not narrowly critical and can range from about 0.05:1 or less to about 50:1 or greater, preferably from about 0.1:1 to about 10:1.

Illustrative of acid catalysts suitable for ring opening of the substituted 3,4-dihydropyran intermediates to form substituted dialdehydes in accordance with reaction step (b) above are mineral acids, including sulfuric acid, hydrochloric acid, phosphoric acid, triflic acid and its salts, sulfonic acids; organic acids including acetic acid, chloroacetic acid, oxalic acid; crosslinked acidic resins such as the various ion exchange resins including Amberlite® CG-400, Amberlite® IR-118; Amberlite® IR120(plus), Dowex® MSC-1, Dowex® M-31, Dowex® M32, Dowex® 50X2-100, Dowex® 50X2-200, Dowex® 50X2-400, Dowex® 50X4-400, Dowex® 50X8-100, Dowex® 50X8-200, Dowex® 50X8-400, Nafion® 117, Nafion® 417, Nafion® NR50, Nafion® perfluorinated powder, similar crosslinked acidic resins; perfluorinated polymers which contain sulfonic acid groups such as XUS-40036.02 (Dow Chemical Company); and the like. The illustrative ion exchange resins above, as well as others, are available from Aldrich Chemical Company, Inc.

The acid catalysts employed in the ring-opening of the substituted 3,4-dihydropyran intermediates are preferably used in conjunction with water; alcohols such as methanol, ethanol, isopropanol, n-propanol, n-butanol, sec-butanol, isobutanol, and tert-butanol, amyl alcohols as well as higher alcohols; glycol ethers such as ethoxy ethanol, methoxy ethanol, 1-methoxypropane, methoxyethoxy ethanol; glyme; and the like, as well as mixtures of water and other solvents. The amount of acid catalyst used in reaction step (b) is dependent on the particular catalyst employed and can range from about 0.01 weight percent or less to about 10 weight percent or greater of the total weight of the starting materials.

The acid dialdehyde reaction mass can be washed with water and/or aqueous solution of neutralizing agents. Illustrative of such neutralizing agents are sodium acetate, potassium acetate, sodium bicarbonate, sodium carbonate, potassium bicarbonate, potassium carbonate, and the like.

Illustrative of suitable substituted dialdehydes prepared in reaction step (b) above include, for example, 3-ethyl-2-methyl-1,5-pentanedial, 2-ethyl-3-propyl-1,5-pentanedial, 3-ethyl-2,4-dimethyl-1,5-pentanedial, 2-ethyl-4-methyl-3-propyl-1,5-pentanedial, 3,4-diethyl-2-methyl-1,5-pentanedial, 3-ethyl-2,4,4'-trimethyl-1,5-pentanedial, 2-ethyl-4,4'-dimethyl-3-propyl-1,5-pentanedial, 2-methyl-2'-propyl-1,5-pentanedial, 3-ethyl-2,4-dimethyl-4'-propyl-1,5-pentanedial, 2-ethyl-4-methyl-3,4'-dipropyl-1,5-pentanedial, 2-butyl-2'-ethyl-1,5-pentanedial, 4-butyl-3,4-diethyl-2-methyl-1,5-pentanedial, 4-butyl-2,4'-diethyl-3-propyl-1,5-pentanedial, and the like.

The step (b) reaction c an be conducted over a wide range of pressures ranging from atmospheric or subatmospheric pressures to superatmospheric pressures, e.g., from about 1 atmosphere or less to about 25 atmospheres or greater. It is preferable to conduct the step (b) reaction at pressures of from about 1 atmosphere to about 10 atmospheres. The step (b) reaction is preferably effected in the liquid or vapor states or mixtures thereof.

The temperature of the step (b) reaction may be as low as about ambient temperature to about 300° C. Preferably, the reaction temperature ranges from about 50° C. to about 200° C., and more preferably from about 60° C. to about 120° C.

Illustrative of catalysts useful in the hydrogenation step (c) involving reduction of substituted dialdehydes include, for example, Raney-type compounds such as Raney nickel and modified Raney nickels; molybdenum-promoted nickel, chromium-promoted nickel, cobalt-promoted nickel; platinum; palladium; iron; cobalt molybdate on alumina; copper chromite; barium promoted copper chromite; tin-copper couple; zinc-copper couple; aluminum-cobalt; aluminum-copper; and aluminum-nickel; platinum; nickel; and the like. The amount of hydrogenation catalyst used in step (c) is dependent on the particular catalyst employed and can range from about 0.01 weight percent or less to about 10 weight percent or greater of the total weight of the starting materials.

The particular reaction conditions for the step (c) hydrogenation reaction are not narrowly critical, and can be any effective hydrogenation procedures sufficient to produce the substituted 1,5-pentanediols of this invention. The step (c) reaction can be carried out at temperatures of from about ambient temperature to about 250° C., preferably from about 70° C. to about 200° C., and more preferably from 90° C. to 150° C. The step (c) reaction preferably may be conducted at pressures of from about 5 atmospheres to about 100 atmospheres, and more preferably from about 10 atmospheres to about 75 atmospheres.

Illustrative of suitable substituted 1,5-pentanediols useful in preparing the polyesters of this invention include, for example, 3-ethyl-2-methyl-1,5- pentanediol, 2-ethyl-3-propyl-1,5-pentanediol, 2,4-dimethyl-3-ethyl-1,5-pentanediol, 2-ethyl-4-methyl-3-propyl-1,5-pentanediol, 2,3-diethyl-4-methyl-1,5-pentanediol, 3-ethyl-2,2,4-trimethyl-1,5-pentanediol, 2,2-dimethyl-4-ethyl-3-propyl-1,5-pentanediol, 2-methyl-2-propyl-1,5-pentanediol, 2,4-dimethyl-3-ethyl-2-propyl-1,5-pentanediol, 2,3-dipropyl-4-ethyl-2-methyl-1,5-pentanediol, 2-butyl-2-ethyl-1,5-pentanediol, 2-butyl-2,3-diethyl-4-methyl-1,5-pentanediol 1,2-butyl-2,4-diethyl-3-propyl-1,5-pentanediol, 3-butyl-2-propyl -1,5-pentanediol and the like, including mixtures thereof.

Illustrative derivatives based on the liquid hydrocarbon diols that are useful in the preparing the polyesters of this invention include, for example, silicone-containing compounds, polyols initiated with said diols, and the like, including mixtures thereof. This invention is not intended to be limited in any manner by the permissible derivatives of liquid hydrocarbon diols.

The silicone-containing derivative compounds useful in this invention can be prepared by conventional methods by either end capping, coupling, or other reaction when Formula I liquid hydrocarbon diols or mixtures of Formula I liquid hydrocarbon diols and optionally other polyols are reacted with silanes. Illustrative of the silane-containing derivative compounds include, for example, the following:

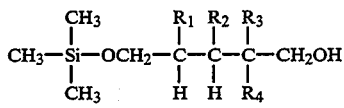

when 1 mole of trimethylchlorosilane and 1 mole of Formula II diol are reacted,

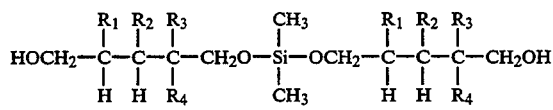

when one mole of dimethyldichlorosilane and two moles of Formula II diol are reacted,

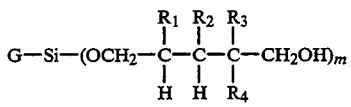

wherein $R_1$, $R_2$, $R_3$ and $R_4$ are as defined above, m is 3 or 4 and G is methyl when m is 3 and nonexistent when m is 4 when 3 moles (m=3) or 4 moles (m=4) of Formula I diol are reacted with methyltrichlorosilane or tetrachlorosilane respectively, and the like. It is preferred that the silane-containing product have residual hydroxyl groups. It is understood by those skilled in the art that when polyfunctional compounds are combined, a variety of products, including chain extended products, can be obtained. Illustrative of the silanes that can be used to produce the silane-containing compounds useful in the compositions of the invention include, for example, chloroalkylchloro and arylchlorosilanes, diphenylethylchlorosilane, trimethylchlorosilane, dimethyldichloromethylsilane, triphenylchlorosilane, methyldichlorosilane, dimethylethylchlorosilane, dichlorosilane; alkoxysilanes such as methoxysilane, dimethoxysilane, diethoxysilane, triethoxysilane, dimethylmethoxychlorsilane, dimethylmethoxysilane, tris(methoxy)-3-chloropropylsilane, and the like, including mixtures thereof.

Illustrative polyols that can be used in combination with the Formula I liquid hydrocarbon diols in preparation of the silicone-containing derivative products useful in this invention include, for example diethylene glycol, 1,4-butanediol, 1,6-hexanediol, 1,4-dihydroxyquinone, 2,2-dimethyl-1,3-propanediol, hydroxyl-terminated polyesters, ethylene oxide/propylene oxide copolymer polyols, poly(ethylene oxide) polyols, poly-(alkylene oxide) polyols, polyether polyols, poly(tetramethylene oxide) polyols, polycarbonate polyols, polylactone polyols, and the like, including mixtures thereof.

The polyol derivative products formed by ring-opening polymerization and initiated with the liquid hydrocarbon diols of Formula I and useful in this invention include, for example, polyols formed by reaction of one mole of the Formula I compound and from about one to about 10 moles of ε-caprolactone, substituted ε-caprolactone, δ-valerolactone, substituted δ-valerolactones, or a mixture of such lactones or other copolymerizable lactones; or from 1 to about 10 moles of propylene oxide, epichlorohydrin, 1,2-butylene oxide, or ethylene oxide or mixtures of such oxides, with it preferred that from 1 to about 4 moles of ethylene oxide be used alone or in the mixtures. If desired both alkylene oxide and lactone units can be present in the polyols. Methods of preparation of such polyols are well known to those skilled in the art of lactone or alkylene oxide polymerization.

The essentially hydroxyl-terminated polyester product can be described as follows when Formula I diols are used in conjunction with a dicarboxylic acid:

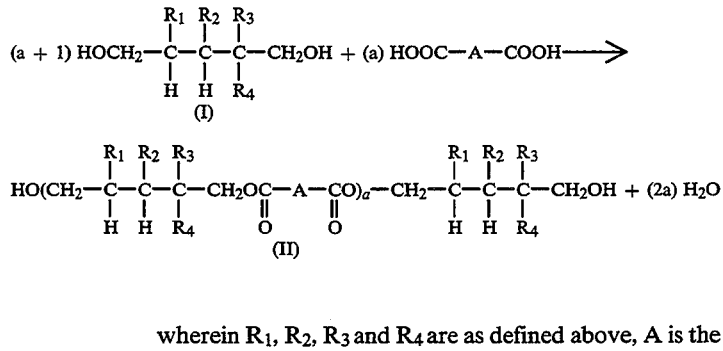

wherein $R_1$, $R_2$, $R_3$ and $R_4$ are as defined above, A is the same or different and is a substituted or unsubstituted hydrocarbon residue, preferably aryl such as phenylene, substituted phenylene, alkyl, cyclohexyl, substituted cyclohexyl and the like, and a is a value of from about 1 to about 300 or greater, preferably from about 1 to about 150 and more preferably from about 1 to about 75 or less.

Illustrative of the polyfunctional carboxylic acids that can be used to prepare the polyesters of this invention include, for example, oxalic acid, malonic acid, succinic acid, glutaric acid, adipic acid, pimelic acid, suberic acid, azelaic acid, sebacic acid, undecanedioic acid, dodecanedioic acid, tridecanedioic acid, maleic acid, fumaric acid, 2-methyl-cis-2-butenedioic acid, 2-methylenesuccinic acid, 1,1-cyclobutanedicarboxylic acid, norcamphoric acid, tetrahydrophthalic acid, methyl-tetrahydrophthalic acid, 1,1-cyclohexanedicarboxylic acid, hexahydrophthalic acid, 1,4-cyclohexanedicarboxylic acid, chlorendic acid, 1,4-benzenediacetic acid, phthalic acid, isophthalic acid, trimellitic acid, any other polyfunctional carboxylic acid including those having substituents thereon such as alkyl or alkoxy groups, nitro, halogen, aryl, carboxyl or any other group that will not unduly interfere with the reaction and the like as well as mixtures of such acids and mixtures of such acids with acid anhydrides.

Illustrative of the acid anhydrides that can be used to prepare the polyesters of this invention include, for example, trimellitic anhydride, tetrahydrophthalic anhydride, phthalic anhydride, isophthalic anhydride, benzophenone dicarboxylic acid anhydride, succinic anhydride, glutaric anhydride, napthoic anhydride, clorendic anhydride, maleic anhydride, or any other intramolecular anhydride including those having substituents thereon such as alkyl or alkoxy groups, nitro, halogen, aryl, carboxyl or any other group that will not unduly interfere with the reaction and the like as well as mixtures of anhydrides or mixtures of anhydrides and polyfunctional carboxylic acids.

Optionally, other di-, tri-, tetra-, and higher-functionality polyols may be used in combination with the 1,5-pentanediols of Formula I to form the polyesters of Formula II. Suitable polyols include, for example, ethylene glycol, diethylene glycol, propylene glycol, dipropylene glycol, polyoxypropylene diols and triols, neopentyl glycol, esterdiols such as Esterdiol-204 and ethoxylated and propoxylated esterdiols, ethylene oxide/propylene oxide copolymer polyols, polyether polyols, polycarbonate polyols, poly(alkylene oxide) polyols, 1,3-propanediol, 1,4-butanediols, poly(tetramethylene oxide) polyols, 1,5-pentanediols other than those of Formula I, 1,6-hexanediols, 2-ethyl-1,3-hexanediol, 1,7-heptanediol, and higher linear and branched hydrocarbon diols, polylactone diols and triols such as the poly-ε-caprolactone polyols; halogenated diols such as 3-chloro-1,2-propanediol, 2,3-dibromo-1,4-butanediol; triols and higher hydroxyl-functional polyols such as trimethylolpropane, pentaerythritol, dipentaerythritol, sorbitol, sucrose; hydroquinone and substituted hydoquinones, bisphenols such as Bisphenol A, Bisphenol C, Bisphenol F, as well as others; 1,2-cyclohexanediols, 1,3-cyclohexanediols, 1,4-cyclohexanediols, 1,4-cyclohexane dimethanol, xylenediols, 2,2,4,4-tetramethyl-1,3-cyclobutanediol, and the like, including mixtures thereof.

The properties of polyester coatings may be altered by changing the ratio of aromatic dicarboxylic acid or acid anhydride, for example isophthalic acid or anhydride, to aliphatic dicarboxylic acid, for example adipic acid. The aromatic dicarboxylic acid is used to confer hardness and the aliphatic dicarboxylic acid is used to confer flexibility and/or toughness to the final coating prepared from the polyester. As this ratio of aromatic dicarboxylic acid to aliphatic dicarboxylic acid is increased and the amount of aromatic dicarboxylic acid increases relative to the amount of aliphatic dicarboxylic acid in the polyester, one would expect an increase in cured coating hardness and a concomitant decrease in impact resistance and/or flexibility. The expected result when an increase in hardness is obtained is a markedly deleterious effect on the impact resistance. By employing the liquid hydrocarbon diols in the polyesters of this invention, one can obtain both a significant increase in hardness and impact resistance when the ratio of aromatic dicarboxylic acid to aliphatic dicarboxylic acid is increased. It is desirable to increase hardness while suffering only minor decreases in impact resistance.

The catalysts that may be used to prepare the polyesters of this invention are those known to persons skilled in the art of polyester preparation, and can be used in conventional amounts, illustrative of which are dibutyltin oxide, antimony oxide, tin oxide, titanium alkoxides, alkali metal salts or metallic salts of manganese, cadmium, magnesium, zinc, cobalt, tin, and the like.

The amount of liquid hydrocarbon diol and optional polyol to be used for preparation of the polyesters of this invention is not narrowly critical; however, it is preferably equal to the number of equivalents of acid plus one so that an essentially hydroxyl-terminated polyester as depicted by Formula II is obtained. If desired, an excess of liquid hydrocarbon diol and optional polyol can be used. These polyesters can be prepared by charging the Formula I 1,5-pentanediol and any other polyol that is to be used through a feeding system to an agitated reactor blanketed with nitrogen or other inert gas. The polyfunctional carboxylic acid and/or acid anhydride are then charged to the reactor in a similar manner. The reactor contents are heated to a temperature of from about 160° C. to about 280° C., preferably from 190° C. to 220° C. Water generated in the condensation reaction is then removed overhead though a condensing system. If desired, an azeotroping solvent for water, such as ethyl benzene, toluene and xylene may be added. If a trifunctional polyol such as trimethylolpropane is to be added, it is usually added after about 3 to 10 hours reaction time to minimize the potential for high viscosity and or gelation. Heating is continued for a period of about 4 to 24 hours, preferably from about 8 to 12 hours. Then a vacuum is applied to remove traces of water, azeotroping solvent, and any other impurities, and heating is continued at temperature. The reaction product transferred to an inerted storage tank, drums, or other vessel, cooled, and stored. If desired, an inert solvent may be added to the reaction mass. Illustrative of such solvents are 1,1,1-trichloroethane, ethoxyethyl acetate, ethoxybutanol acetate, butyl acetate, methyl isobutyl ketone, methyl amyl ketone, methyl ethyl ketone, xylene, toluene, benzene, ethyl benzene, and the like.

If desired, the polyesters of this invention can be produced by transesterification processes. Such transesterification processes can be conducted in accordance with conventional procedures known in the art.

Coatings can be produced by formulating the polyesters of this invention with one or more of a variety of crosslinking agents including, for example, aminoplasts, phenolics, cycloaliphatic epoxides, isocyanates, blocked isocyanates, and the like, along with suitable thermal-cure catalysts or onium salt photoinitiators for the reaction. Included in the coating formulation could be a variety of ingredients known to those skilled in the art of formulating coatings including but not limited to surface active agents, thickeners, reactive diluents, vinyl esters, vinyl ethers, acrylates, polyols, epoxides, flow and leveling agents, colored organic and inorganic pigments, pearlescent colorants, ceramic pigments, extenders, slip agents such as the silicone oils, powdered polytetrafluoroethylene and/or ethylene; coupling agents, stabilizers, antioxidants, solvents, waxes, adhesion promoters, lubricants such as lanolin wax, petrolatum, polyethylene wax; and the like. The coating ingredients can be employed in conventional amounts known in the art.

Illustrative of the aminoplasts are alkoxymelamines, melamine-formaldehydes, urea-formaldehydes, alkylated benzoquaniamines, guanyl ureas, guanidienes, biguanidines, such as hexamethoxymethylmelamine, methylated melamine, butylated melamine, butylated urea, and the like.

Phenolic crosslinking agents are the soluble, heat-reactive phenols or resoles such as those described in T. S. Carswell, *Phenoplasts*, pages 9–29, Interscience Publishers Inc., N.Y. (1947) and in J. A. Brydson, *Plastics Materials*, pages 385–386, D. Van Nostrand Co. Inc., N.J. (1966). Such heat reactive phenolics are generally made by reacting various phenols with an excess of formaldehyde under basic conditions. Illustrative of the heat-reactive phenolics are monomers and polymers of alkylated phenol-formaldehyde, alkylated cresol-formaldehyde, including methylated phenol-formaldehyde, butylated phenol-formaldehyde, cresol-formaldehyde, and the like as well as the variety of heat reactive phenolics made by reacting phenol, propyl phenols, butyl phenols, amyl phenols and higher hydrocarbon phenols, o-, m-, and p-cresol, xylenols, and the like with formaldehyde in the presence of a suitable catalyst such as ammonia, ethylamine, triethylamine, as well as other phenolics which are known in the art of making heat reactive phenolics.

Illustrative of the cycloaliphatic epoxides that are useful as crosslinking agents are those having an average of two or more epoxide groups per molecule such as 3,4-epoxycyclohexylmethyl 3,4-epoxycyclohexane-carboxylate, 3,4-epoxy-1-methyl-cyclohexylmethyl 3,4-epoxy-1-methylcyclohexanecarboxylate, 6-methyl-3,4-epoxycyclohexylmethyl 6-methyl -3,4-cyclohexanecarboxylate, the compounds described in U.S. Pat. No. 2,890,194; bis(3,4-epoxycyclohexylmethyl)oxylate, bis(3,4-epoxycyclohexylmethyl)adipate, bis(3,4-epoxycyclohexylmethyl)pimelate, bis(3,4-epoxy-6-methyl-cyclohexylmethyl), the compounds described in U.S. Pat. No. 2,750,395; 3,4-epoxycyclohexyl-5,5-spiro-3,4-epoxy)cyclohexane -m-dioxane, and like compounds as described in U.S. Pat. No. 3,318,822; cyclopentadiene diepoxide, cyclohexane diepoxide, limonene diepoxide, and the like. If desired, the formulations may contain minor amounts of cycloaliphatic monoepoxides such as limonene monoepoxide, vinyl cyclohexene monoepoxide, alpha-pinene monoepoxide, norbornene monoepoxide, cyclohexene monoepoxide, as well as 3,4-epoxy derivatives of alkoxylated and/or lactone derivatives of tetrahydrobenzyl alcohol, and the like.

The formulated, uncured coatings containing the polyesters of the invention and cycloaliphatic epoxides can be cured with ultraviolet light when suitable photoinitiators are included in the formulation. The photoinitiators that can be used are of the onium salt type. The ratio of polyester to cycloalphatic epoxide can vary broadly in the photocurable compositions, since a wide variety of hard or soft coatings can be made. However, it is preferred that from about 1 to about 50 parts of the polyester and from about 50 to 99 parts of the cycloaliphatic epoxide be used in the compositions, and more preferred from about 1 to about 30 parts of the polyester and from about 70 to about 99 parts of the cycloaliphatic epoxide be used. If desired, polyols can be added to the formulation as well as surfactants and acrylates, particularly multifunctional acrylates. Illustrative of the polyols that can be used include poly-ε-caprolactone polyols, polyester polyols, polyoxypropylene polyols, poly(oxypropylene/oxyethylene) polyols, polyoxyethylene polyols, polycarbonate polyols, poly(tetramethylene oxide) polyols, ethylene glycol, 1,4-butanediol, 2-ethyl-3-propyl-1,5-pentanediol, 1,6-hexanediol, and the like. Illustrative of the acrylates that can be used include 2-ethyl hexyl acrylate, trimethylolpropane triacrylate, 1,6-hexanediol diacrylate, ethoxylated trimethylolpropane triacrylate, propoxylated trimethylolpropane triacrylate, higher functional acrylates, and the like.

Illustrative of the onium salt photoinitiators useful in the protocurable coating compositions of this invention containing mixtures of the polyesters of the invention, cycloaliphatic epoxides, and optional ingredients one can mention one or more of a metal fluoroborate and a complex of boron trifluoride as described in U.S. Pat. No. 3,379,653; a bis(perfluoroalkylsulfonyl)methane metal salt, as described in U.S. Pat. No. 3,586,616; an aryl diazonium compound as described in U.S. Pat. No. 3,708,296; an aromatic onium salt of Group VIa elements as described in U.S. Pat. No. 4,058,400; an aromatic onium salt of Group Va elements as described in U.S. Pat. No. 4,069,055; a dicarbonyl chelate of a Group IIIa-Va element as described in U.S. Pat. No. 4,068,091; a thiopyrylium salt as described in U.S. Pat. No. 4,139,655; a Group VIb element in an $MF_6$ anion where M is selected from phosphorous, antimony, and arsenic as described in U.S. Pat. No. 4,161,478; an arylsulfonium complex salt as described in U.S. Pat. No. 4,231,951; an aromatic iodonium complex salt and an aromatic sulfonium complex salt, as described in U.S. Pat. No. 4,256,828; and a bis(4-diphenylsulfonio)phenyl) sulfide-bis-hexafluorometallic salts such as the phosphate, arsenate, antimonate and the like as described by W. R. Watt and coworkers in J. Polymer Sci.: Polymer Chem. Ed., 22, 1789 (1984). Preferred cationic photoinitiators include the arylsulfonium or aryliodonium complex salts, aromatic sulfonium or iodonium salts of halogen containing complexions, and aromatic onium salts of Group II, V, and VI elements. Some of such salts are commercially available in a solution form as FX-512, thought to be any arylsulfonium hexafluorophosphate, from 3M Co.; CYRACURE® UVR-6990 and UVR-6974, arylsulfonium hexafluorophosphate and arylsulfonium hexafluoroantimonate, respectively, from Union Carbide Chemicals and Plastics Company Inc.; UVE-1014 and UVE-1016, arylsulfonium hexafluorophosphate and arylsulfonium hexafluoroantimonate, respectively, from General Electric Co., KI-85, thought to be bis(4-(disphenyl -sulfonio)Phenyl)sulfide-bis-hexafluorophosphate, from Degussa AG; and SP-150 and SP-170, thought to be bis(4-(diphenylsulfonio)phenyl)-sulfide-bis-hexafluorophosphate and bis(4-(diphenylsulfonio) -phenyl)sulfide-bis-hexafluoroantimonate, respectively, from Asahi Denka Kogyo K. K. The onium salt photoinitiators are used at a concentration of less than about 0.1 weight percent to about 10 weight percent, preferably at concentrations of about 0.3 weight percent to about 5 weight percent of the total composition.

Illustrative of the polyfunctional isocyanates useful for crosslinking the polyesters of this invention are those known and include, for example, 2,4-toluene diisocyanate and 2,6-toluene diisocyanate as well as mixtures of these diisocyanates; 3-isocyanatomethyl-3,5,5trimethylcyclohexylisocyanate, 4,4'-diphenylmethane diisocyanate (MDI), 4,4'-dicyclohexyldiisocyanate or reduced MDI, meta- and para-tetramethyl xylene diisocyanate, hexamethylene diisocyanate, 4,4', 4"-triisocyanatotriphenylmethane, 2,2,4- and 2,4,4trimethylenehexamethylene diisocyanate, and the like.

Illustrative of the catalysts that can be used to thermal cure the polyesters cured with aminoplast, phenolic, or cycloaliphatic epoxide coatings of this invention include, for example, para-toluene sulfonic acid, triflic acid salts, boron trifluoride etherate, boron trifluoride, sulfonium salts, and the like. Illustrative of the triflic acid salts are diethylammonium triflate, ammonium triflate, di-isopropylammonium triflate and others. These catalysts are usually used at concentration of about 0.05 weight percent to about 1 weight percent of the formulation.

Illustrative of the catalysts that can be used to catalyze the isocyanate/hydroxyl reaction that is involved in crosslinking the polyesters with multifunctional isocyanates to form urethane linkages are known to those skilled in the art. Illustrative of such catalysts which can be used in conventional amounts include organometallics such as stannous octanoate, zinc octanoate, dibutyltin dilaurate; amines such as the alkanolamines, tetramethyldiamines; and the like.

The polyester-containing coatings of this invention can be applied and cured on a variety of substrates known to those skilled in the art of coatings technology. Illustrative of such substrates are steel, treated steel, tin-plated steel, galvanized steel, treated and untreated aluminum, glass, wood, paper, coated or printed paper, epoxy/fiberglass composites, polymers such as poly(ethylene terephthalate), poly(butylene terephthalate), treated polyethylene and polypropylene, vinyl film, vacuum or vapor deposited aluminum, gold, copper, silver, zinc, nickel, tin, and other metals, electroless nickel, copper-nickel alloys and the like, electrodeposited metals such as silver, copper, nickel, chromium, silver-copper alloys, and the like, glass-reinforced unsaturated-polyester/styrene products, and the like.

As used herein, the term "polyol" is contemplated to include all permissible hydrocarbon compounds having 2 or more hydroxyl groups, e.g., diols, triols and the like.

For purposes of this invention, the term "hydrocarbon" is contemplated to include all permissible compounds having at least one hydrogen and one carbon atom. In a broad aspect, the permissible hydrocarbons include acyclic and cyclic, branched and unbranched, carbocyclic and heterocyclic, aromatic and nonaromatic organic compounds which can be substituted or unsubstituted.

As used herein, the term "substituted" is contemplated to include all permissible substituents of organic compounds unless otherwise indicated. In a broad aspect, the permissible substituents include acyclic and cyclic, branched and unbranched, carbocyclic and heterocyclic, aromatic and nonaromatic substituents of organic compounds. Illustrative substituents include, for example, alkyl, alkyloxy, aryl, aryloxy, hydroxy, hydroxyalkyl, amino, aminoalkyl, halogen and the like in which the number of carbons can range from 1 to about 20 or more, preferably from 1 to about 12. The permissible substituents can be one or more and the same or different for appropriate organic compounds. This invention is not intended to be limited in any manner by the permissible substituents of organic compounds.

In addition to the solids fraction, a solvent fraction is also typically employed in coating compositions in order to act as a vehicle in which the solid fraction is transported from one medium to another. The solvent fraction is comprised of essentially any active organic solvent and/or non-aqueous diluent which is at least partially miscible with the solids fraction so as to form either a solution, dispersion, or suspension. As used herein, an "active solvent" is a solvent in which the solids fraction is at least partially soluble. The selection of a particular solvent fraction for a given solids fraction in order to form a specific coating formulation for application by airless spray techniques is conventional and well known to those skilled in the art. In general, up to about 30% by weight of water, preferably up to about 20% by weight, may also be present in the solvent fraction of the present invention provided that a coupling solvent is also present in the formulation. All such solvent fractions are suitable in the present invention.

A coupling solvent is a solvent in which the polyester compounds used in the solids fraction is at least partially soluble. Most importantly, however, such a coupling solvent is also at least partially miscible with water. Thus, the coupling solvent enables the miscibility of the solids fraction, the solvent fraction and the water to the extent that a single phase is desirably maintained such that the composition may optimally be sprayed and a good coating formed.

Coupling solvents are well known to those skilled in the art and any conventional coupling solvents which are able to meet the aforementioned characteristics, namely, those in which the polyperic components of the solid fraction is at least partially soluble and in which water is at least partially miscible are all suitable for being used in the present invention.

Applicable coupling solvents which may be used in the present invention include, but are not limited to, ethylene glycol ethers; propylene glycol ethers; chemical and physical combinations thereof; lactams; cyclic ureas; and the like.

One of the unique features of the present invention is that the featured polyesters are liquid polymers, that is, polymers which are in the liquid state at standard temperature and pressure conditions (STP). By combining a compressed fluid with the liquid polyester polymer(s) utilized in the present invention, the viscosity of the resulting liquid mixture is reduced to the point where it is easily transportable, such as being sprayed. In this manner, no other solvent, such as active solvent, may be required thereby totally eliminating volatile organic solvents from the system.

Examples of compounds which may be used as the compressed fluids are given in Table 1.

TABLE 1

| EXAMPLES OF COMPRESSED FLUIDS | | | | |
|---|---|---|---|---|
| Compound | Boiling Point (C.) | Critical Temperature (C.) | Critical Pressure (atm) | Critical Density (g/ml) |
| Carbon Dioxide | −78.5 | 31.3 | 72.9 | 0.448 |
| Nitrous Oxide | −88.56 | 36.5 | 71.7 | 0.45 |
| Ammonia | −33.35 | 132.4 | 112.5 | 0.235 |
| Xenon | −108.2 | 16.6 | 57.6 | 0.118 |
| Ethane | −88.63 | 32.28 | 48.1 | 0.203 |
| Propane | −42.1 | 96.67 | 41.9 | 0.217 |
| Chlorotrifluoromethane | −31.2 | 28.0 | 38.7 | 0.579 |
| Monofluoromethane | −78.4 | 44.6 | 58.0 | 0.3 |

Preferably, the compressed fluid has a critical temperature above the ambient temperature of the spray environment and has appreciable solubility in the coating composition.

Moreover, the compressed fluid is preferably environmentally compatible, can be made environmentally compatible by treatment, or can be readily recovered from the spray environment. For example, carbon dioxide is environmentally compatible. Nitrous oxide can be made environmentally compatible by natural decomposition in the environment, or by heating to thermally decompose it, to form molecular nitrogen and oxygen. Ethane and propane can be made environmentally compatible by incineration to carbon dioxide and water.

Ammonia is highly soluble in water and can be removed and recovered from air streams by absorption methods such as an air/water scrubber. Other methods can also be used such as adsorption.

The utility of any of the above-mentioned compounds as compressed fluids and viscosity reducing diluents in the practice of the present invention will depend upon the polymeric compound(s) that may be present in addition to the polyesters featured in the present invention and the specific solvent fraction used, if any, taking into account the temperature and pressure of application and the inertness of the compressed fluid with the remaining constituents of the coating composition.

Due to their environmental compatibility, low toxicity, non-flammability, favorable physical properties at ambient temperature, and high solubility in coating compositions, compressed carbon dioxide and nitrous oxide are preferably used in the practice of the present invention. Due to its low cost and wide availability, compressed carbon dioxide is most preferred. However, use of any of the aforementioned compounds and mixtures thereof are to be considered within the scope of the present invention. For example, mixtures of compressed carbon dioxide and nitrous oxide may be useful because nitrous oxide is more polar than carbon dioxide and has different solvent properties. Compressed ammonia has still higher polarity and even relatively small amounts in combination with nitrous oxide may be useful to obtain higher solubility in some coating compositions. Subcritical compressed ammonia tends to react with subcritical compressed carbon dioxide, but this may be useful with some coating compositions.

Supercritical fluids not only function as a viscosity reducer, but they also produce vigorous decompressive atomization by a new airless spray atomization mechanism. This greatly improves the airless spray process so that high quality coatings are applied. Subcritical compressed fluids also produce such decompressive atomization as well.

Preferably, it is desirable that the coating composition contains one or more polymeric compounds, which may be the polyester compounds featured in the present invention, having a number-average molecular weight that is less than about 5,000. Preferably, the number-average molecular weight is less than about 2,500. Most preferably, the number-average molecular weight is less than about 1,500.

In order to provide an effective coating composition, the number-average molecular weight of all the polymeric compounds when taken as a whole should be greater than 500. Preferably, the number-average molecular weight of all the polymeric compounds when taken as a whole should be greater than 800. Most preferably, the number-average molecular weight of all the polymeric compounds when taken as a whole should be greater than 1,000.

In addition to considering the molecular weight of the one or more polymeric components contained in the composition, including the polyester compounds featured in the present invention, for obtaining the desired viscosity reducing diluent effect when utilizing a compressed subcritical fluid, such that the composition may be sprayed, if so desired, it is also preferable that the solubility of the composition with a compressed fluid, particularly a compressed subcritical fluid, as well as its viscosity also be considered.

Accordingly, it is also desirable that the composition, such as a coating composition, have solubility characteristics which maximize the viscosity reducing effect of the compressed fluid and if the admixed coating composition is to be sprayed, solubility characteristics which provide for a desirable coating. Thus, the solubility of the compressed fluid with the composition in its compressed state and, if sprayed, at the conditions of the substrate should desirably be optimized.

The solubility requirements for these two sets of conditions are totally antithetical to one another. Thus, when admixing the compressed fluid with the coating composition, it is desirable to have a composition which has a high solubility for the compressed fluid. In contrast, once the admixed coating composition is sprayed, for example, it is desirable that the solubility for the fluid at the conditions present in the environment of the substrate be as low as possible.

Accordingly, it is preferable that the composition containing the one or more polymeric compounds, particularly the polyester compounds of the present invention, have an overall solubility with the compressed fluid at the temperature and pressure of admixture with the composition (prior to spraying) of at least 10% by weight of the compressed fluid in the liquid mixture that is formed. Preferably, the solubility should be at least about 15% by weight of the compressed fluid in the mixture, and more preferably, about 20 to 70% or greater by weight on the same basis. Most preferably, it is in the range of from about 25% to about 50% by weight. As discussed earlier, the polyester compounds of the present invention have a relatively high compatibility with the compressed fluids, particularly compressed carbon dioxide.

If the composition is only to be made transportable, then the solubility aspect with the compressed fluid is all that needs to be considered. However, if the composition is to be sprayed, then it is desirable to have the compressed fluid diffuse through the sprayed composition as quickly as possible such that there is very little residual fluid left in the coating once it has come into contact with the substrate. Accordingly, the fluid, which of course is no longer compressed (at least to the extent that it was prior to spraying), should have a solubility with the coating composition of less than about 0.80% by weight of the fluid in the non-compressed state in the composition. Preferably, the solubility of the fluid is less than about 0.60% by weight in the composition. Most preferably, the fluid should be soluble in the coating composition in an amount of less than about 0.40%. As used herein, it is to be understood that the solubility of the fluid in the non-compressed state, i.e., at one atmosphere pressure, is measured at 25° C. and at one atmosphere absolute pressure of the fluid.

If the composition is intended to be sprayed, then the starting viscosity should desirably also be considered. It should have a viscosity of less than about 10,000 centipoise, and preferably less than about 5,000 centipoise, and most preferably less than about 3,000 centipoise at a temperature of 25° C. Obviously, a major factor contributing to the viscosity of the liquid mixture is the amount of solvent fraction contained therein. Hence, it is apparent that the amount of solvent fraction present in the composition should be considered hand-in-hand with the desired viscosity that is to be obtained. However, the polyesters of the present invention, at 100% solids, possess a relatively low viscosity and indeed are in the form of a liquid at standard temperature and pressure conditions. Depending upon the other constituents utilized in the coating composition, an active solvent may not be needed at all. Of course, if it is desired to reduce the viscosity even further, a small amount of an active solvent may be used, if so desired. The polyesters of the present invention provide low viscosity and a high compatibility with the viscosity reducing diluent, such as compressed carbon dioxide, thereby enabling the preparation of a liquid admixture with the use of only a minimum amount of active solvent or not active solvent at all, while still providing a desirable spray viscosity. Generally, the liquid polyester compounds of the present invention, at 100% solids, have a viscosity at 25° C. in the range of from about 1,000 to about 200,000 centipoise, typically in the range of from about 5,000 to about 100,000 centipoise.

The viscosity of the overall coating composition should be low enough such that there is enough solvent present to provide proper coalescence upon the substrate once the composition is sprayed while still being high enough to allow for a reduction in solvent usage so as to maximize the utilization of the compressed fluid viscosity diluent and to concomitantly facilitate good atomization and coating formation.

The viscosity of the coating composition should also be such that when compressed fluid is added, it is possible to add enough of the compressed fluid such that the viscosity is lowered to less than about 150 centipoise at the conditions of the compressed fluid so as to render the liquid mixture suitable for spray application. More preferably, the admixed coating composition has a viscosity which is less than about 100 centipoise and preferably has a viscosity of from about 1 to about 75 centipoise. Most preferably, the viscosity of the admixture of solids fraction, solvent fraction and subcritical compressed fluid is in the range of from about 5 to about 50 centipoise at the conditions of the compressed fluid.

If the composition is not meant to be sprayed, but rather, transported by some other means such as by pumping, and the like, then the compressed fluid should be present in quantities such that a liquid mixture is formed which possesses a viscosity such that it is readily transportable by whatever means is desired.

When a solvent fraction is utilized, the polymeric component of the liquid mixture is generally present in amounts ranging from 10 to 75 weight percent based upon the total weight of the polymer(s), solvent fraction, and compressed fluid. Preferably, the polymer component is present in amounts ranging from about 20 to about 65 weight percent on the same basis.

If compressed carbon dioxide fluid is utilized as the viscosity reducing diluent, it preferably should be present in amounts ranging from about 10 to about 75 weight percent based upon the total weight of the polymer(s), solvent fraction (if any) and compressed fluid. Most preferably, it is present in amounts ranging from 20 to 60 weight percent on the same basis producing a liquid mixture having a viscosity in the range of from about 5 centipoise to about 50 centipoise at the conditions of the compressed fluid.

In order to minimize the unnecessary release of any active solvent present in the liquid spray mixture, the amount of active solvent used should be less than that required to produce a mixture of polymeric compounds and active solvent having a viscosity which will permit its application by liquid spray techniques. In other words, the inclusion of active solvent(s) should be minimized such that the viscosity diluent effect provided by the compressed fluid is fully utilized. Generally, this requires that the mixture of polymeric compounds, including the polyester compounds of the present invention and active solvent have a viscosity of not less than about 150 centipoise at 25° C. Preferably, the solvent(s) should be present in amounts ranging from about 0 to about 70 weight percent based upon the total weight of the polymer(s), solvent(s) and compressed fluid. Most preferably, the solvent(s) are present in amounts ranging from about 5 to about 50 weight percent on the same basis.

Generally, the temperature and pressure of the compressed fluid used as the viscosity reducing diluent and atomization enhancer with the coating composition is as low as possible while still obtaining the desired viscosity reducing effect and desired atomization and spray characteristics. Generally, temperatures are preferred at which the compressed fluid has a ratio of gas density to liquid density at equilibrium of greater than about 0.1 regardless of the pressure that is utilized. If the pressure is greater than the critical pressure of the compressed fluid, then it is desirable that the temperatures be such that the ratio of gas density to liquid density at equilibrium be less than about 0.8. Alternatively, if the pressure is less than the critical pressure of the compressed fluid, then the temperatures should desireably be less than about 20 degrees C. above the critical temperature of the compressed fluid.

More preferably, temperatures are utilized at which the compressed fluid has a ratio of gas density to liquid density at equilibrium of greater than about 0.25 regardless of the pressure that is utilized. If the pressure is greater than the critical pressure of the compressed fluid, then it is desirable that the temperatures be such that the ratio of gas density to liquid density at equilibrium be less than about 0.6. Alternatively, if the pressure is less than the critical pressure of the compressed fluid, then the temperatures should desireably be less than about 10 degrees C. above the critical temperature of the compressed fluid. At these temperatures the compressed fluid has high compressibility in both the liquid and gas phases. Of course, the less energy used to either heat or cool the fluid the better. Most preferably, the temperature at which the compressed fluid is used as the viscosity reducing diluent and atomization enhancer is at ambient or near ambient temperature. Cooling the fluid is generally not beneficial for it typically tends to increase the viscosity of the admixed composition. Excessive heating of the fluid is also to be avoided so as to prevent possible thermal degradation of the composition constituents.

The pressure at which the compressed gas is provided is as low as possible and yet is able to provide the viscosity reducing effect desired at the temperature and pressure chosen. This is typically dependent upon the composition that is to be admixed with the compressed fluid and the amount of active solvent, if any, that it contains.

When the composition is to be sprayed, the pressure of the compressed fluid will be that of the spray pressure. This spray pressure too is a function of the coating composition, the compressed fluid being used, and the viscosity of the liquid mixture formed by admixing the compressed fluid and the coating composition. The minimum spray pressure should be at least about 300 psi greater than the environment into which the composition will be sprayed, typically into atmospheric or near atmospheric pressure. Generally, when using a compressed subcritical fluid, the pressure will be less than about 95 percent of the absolute critical pressure of such compressed fluid if the temperature is above the critical temperature of the compressed fluid. The pressure will be less than about 600 psi above the absolute critical pressure of the compressed fluid if the temperature is below the critical temperature of such compressed fluid. Preferably, the spray pressure is in the range of from about 50 percent to about 90 percent of the absolute critical pressure of the compressed subcritical fluid. If the compressed subcritical fluid is compressed subcritical carbon dioxide fluid, the preferred spray pressure is between about 500 psia and about 1020 psia. The most preferred spray pressure for carbon dioxide being used in the subcritical mode is between about 700 psia and about 970 psia.

If the composition is to be sprayed, the spray temperature used is a function of the coating composition, the compressed subcritical fluid being used, and the concentration of compressed subcritical fluid in the liquid mixture. As the temperature is decreased, the viscosity of the admixed composition generally tends to increase. Accordingly, the minimum spray temperature is that temperature at which the admixed coating composition would have a maximum viscosity needed for obtaining desirable spray characteristics, such as good atomization. The maximum temperature is the highest temperature at which the components of the liquid mixture are not significantly thermally degraded during the time that the liquid mixture is at that temperature. However, it is most preferred that the temperature be the same or nearly the same temperature at which the substrate is maintained, generally ambient temperature.

When the compressed fluid that is used in the supercritical state, generally no benefit is realized to have the compressed fluid be at a pressure and/or temperature which is well beyond the critical point, (i.e., the critical pressure and critical temperature) of that fluid. The properties and characteristics of the fluid in its supercritical state will be obtained without having to resort to excessive temperatures and/or pressures.

The compressed fluid maintained at a given temperature and pressure may be mixed with a composition which is at a different temperature and pressure. The resulting temperature and pressure of the mixture would then have to be adjusted, if necessary, to provide the desired conditions so as to obtain the viscosity reducing effect of the fluid. Thus, if a subcritical compressed fluid maintained at a temperature of 20° C. and a pressure 1000 psi were introduced into a closed chamber containing a composition at a temperature of 0° C. and 100 psi, and the resulting admixture produced a liquid mixture at 100° C. and a pressure of 500 psi, it may be necessary to raise the pressure of the liquid mixture so as to obtain the desired viscosity reducing effect from the compressed fluid.

Alternatively, the material used as the compressed fluid may be introduced into the composition while still a gas at one set of temperature and pressure conditions, and then be heated and/or pressurized to the desired extent by heating the admixture and thereby provide the material as a compressed fluid (either in the supercritical or subcritical state) and obtain concomitant viscosity reducing effect.

The liquid mixture of polymers containing at least one of the polyester polymers featured in the present invention, the compressed fluid, and, optionally, an active solvent, may be sprayed onto a substrate to form a liquid coating thereon by passing the liquid mixture under pressure through an orifice into the environment of the substrate to form a liquid spray.

Coating compositions are commonly applied to a substrate by passing the coating composition under pressure through an orifice into air in order to form a liquid spray, which impacts the substrate and forms a liquid coating. In the coatings industry, three types of orifice sprays are commonly used; namely, air spray, airless spray, and air-assisted airless spray, all of which may be used in in the present invention for applying the admixed coating composition onto a substrate.

Air spray, airless spray, and air-assisted airless spray can also be used with the liquid coating formulation heated or with the air heated or with both heated. Heating reduces the viscosity of the liquid coating formulation and aids atomization.

As used herein, an orifice is a hole or an opening in a wall or housing, such as in a spray tip of a spray nozzle on a conventional or electrostatic spray gun through which the admixed liquid mixture flows in going from a region of higher pressure, such as inside the spray gun, into a region of lower pressure, such as a typical air environment outside of the spray gun and around the substrate. An orifice may also be a hole or an opening in the wall of a pressurized vessel, such as a tank or cylinder. An orifice may also be the open end of a tube or pipe or conduit through which the mixture is discharged. The open end of the tube or pipe or conduit may be constricted or partially blocked to reduce the open area.

Spray orifices, spray tips, spray nozzles, and spray guns used for conventional and electrostatic airless and air-assisted airless spraying of coating formulations are suitable for spraying the admixed coating compositions of the present invention which contain the featured polyesters. Spray guns, nozzles, and tips are preferred that do not have excessive flow volume between the orifice and the valve that turns the spray on and off. Moreover, the spray guns, nozzles, and tips should be built to contain the spray pressures used.

There are a broad variety of spray devices that one may use in spraying the coating compositions after it has been admixed with a compressed fluid. Essentially, any spray gun may be used containing essentially any nozzle tip, from conventional airless and air-assisted airless spray devices to electrostatic spray devices. The choice of spray device is dependent upon the kind of application that is contemplated.

The orifice sizes suitable for spraying the admixed liquid mixture should generally range from about 0.004-inch to about 0.072-inch diameter. Because the orifices are generally not circular, the diameters referred to are equivalent to a circular diameter. The proper selection is determined by the orifice size that will supply the desired amount of liquid coating and accomplish proper atomization for the coating. Generally, smaller orifices are desired at lower viscosity and larger orifices are desired at higher viscosity. Smaller orifices give finer atomization but lower output. Larger orifices give higher output but poorer atomization. Finer atomization is preferred. Therefore, small orifice sizes from about 0.004-inch to about 0.025-inch diameter are preferred.

The designs of the spray tip that contains the spray orifice and of the spray nozzle that contains the spray tip are not critical. The spray tips and spray nozzles should have no protuberances near the orifice that would interfere with the spray. The spray tips and nozzles should preferably have minimal internal void space to produce a clean shut off of the spray.

The shape of the spray is also not critical for being able to spray the liquid mixture. The spray may be in the shape of a cone that is circular or elliptical in cross section or the spray may be in the shape of a flat fan, but the spray is not limited to these shapes. Sprays that are flat fans or cones that are elliptical in cross section are preferred. The distance from the orifice to the substrate is generally at a distance of from about 4 inches to about 24 inches.

Devices and flow designs that promote turbulent or agitated flow in the admixed liquid mixture prior to passing the liquid mixture under pressure through the orifice may also be used. Such techniques include but are not limited to, the use of pre-orifices, diffusers, turbulence plates, restrictors, flow splitters/combiners, flow impingers, screens, baffles, vanes, and other inserts, devices, and flow networks that are used in airless spray and air-assisted airless spray.

Filtering the liquid mixture prior to flow through the orifice is desirable in order to remove particulates that might plug the orifice. This can be done using conventional high-pressure paint filters. A filter may also be inserted at or in the gun and a tip screen may be inserted at the spray tip to prevent orifice plugging. The size of the flow passages in the filter should be smaller than the size of the orifice, preferably significantly smaller.

Electrostatic forces may be used to increase the proportion of coating composition that is deposited onto a substrate from the spray. This is commonly referred to as increasing the transfer efficiency. This is done by using a high electrical voltage relative to the substrate to impart an electrical charge to the spray. This creates an electrical force of attraction between the spray droplets and the substrate which causes droplets that would otherwise miss the substrate to be deposited onto it. When the electrical force causes droplets to be deposited on the edges and backside of the substrate, this effect is commonly referred to as wrap around.

Preferably the substrate is grounded, but it may also be charged to the opposite sign as the spray. The substrate may be charged to the same sign as the spray, but at a lower voltage with respect to ground, but this is of less benefit, because this produces a weaker electrical force of attraction between the spray and the substrate than if the substrate were electrically grounded or charged to the opposite sign. Electrically grounding the substrate is the safest mode of operation. Preferably, the spray is charged negative relative to electrical ground.

These methods of electrostatic charging are known to those who are skilled in the art of electrostatic spraying.

The environment into which the admixed coating composition is sprayed is not critical. However, the pressure therein must be less than that required to maintain the compressed fluid component of the liquid spray mixture in the compressed state. Preferably, the admixed liquid coating composition is sprayed in air under conditions at or near atmospheric pressure. Other gas environments can also be used, such as air with reduced oxygen content or inert gases such as nitrogen, carbon dioxide, helium, argon, xenon, or a mixture. Oxygen or oxygen enriched air is not desirable, because oxygen enhances the flammability of organic components in the spray.

Generally, liquid spray droplets are produced which generally have an average diameter of one micron or greater. These liquid droplets contain a portion of the solids, a portion of the solvent (if any), and a portion of the compressed fluid. Preferably, these droplets have average diameters of from about 10 to about 1000 microns. More preferably, these droplets have average diameters of from about 15 to about 200 microns. Most preferably, these droplets have average diameters of from about 20 to about 100 microns. Small spray droplets are desirable to vent the compressed fluid from the spray droplet before impacting the substrate. Small spray droplets also give higher quality finishes.

The processes of the present invention may be used to apply coatings by the application of liquid spray to a variety of substrates. Examples of suitable substrates include, but are not limited to, metals, wood, glass, plastic, mold surfaces, paper, cloth, ceramic, masonry, stone, cement, asphalt, rubber, composite materials, and the like.

Through the practice of the present invention, films may be applied to substrates such that the cured films have thicknesses of from about 0.2 to about 10.0 mils. Preferably, the films have thicknesses of from about 0.5 to about 8.0 mils, and most preferably, the thickness range is from about 0.8 to about 4.0 mils.

If curing of the coating composition present upon the coated substrate is required, it may be performed by conventional means, such as allowing for evaporation of the active and/or coupling solvent, application of heat or ultraviolet light, etc.

Compressed gas may be utilized to assist formation of the liquid spray and/or to modify the shape of the liquid spray that comes from the orifice. The assist gas is typically compressed air at pressures from 5 to 50 psi, but may also be air with reduced oxygen content or inert gases such as compressed nitrogen, carbon dioxide, helium, argon, or xenon, or a mixture. Compressed oxygen or oxygen enriched air is not desirable because oxygen enhances the flammability of the organic components in the spray. The assist gas is directed into the liquid spray as one or more high-velocity jets of gas, preferably arranged symmetrically on each side of the liquid spray to balance each other. The assist gas jets will preferably come from gas orifices built into the spray tip and/or nozzle. The assist gas may also issue from an opening in the spray tip or nozzle that is a concentric annular ring that is around and centered on the liquid orifice, to produce a hollow-cone high-velocity jet of gas that converges on the liquid spray, but this creates a larger flow of assist gas that is not as desirable. The concentric annular ring may be divided into segments, to reduce gas flow rate, and it may be elliptical instead of circular, to shape the spray. Preferably, the flow rate and pressure of the assist gas are lower than those used in air spray. Preferably the assist gas is heated to counteract the rapid cooling effect of the subcritical compressed fluid diluent in the spray. The preferred temperature of heated assist gas ranges from about 35° C. to about 90° C.

We have also found that there are additives that may be added to the liquid mixture which will improve the atomization enhancement effect provided by the compressed fluid. For example, pigments and other solid particulate additives such as fillers have been found to expand the range of conditions in which vigorous decompressive atomization can be obtained. For example, a coating composition that gives a clear coating that is difficult to atomize can often give improved atomization by incorporating pigment into the coating formulation. In particular, titanium dioxide pigments have been found to give better atomization at lower temperatures and also to allow more compressed carbon dioxide to be used in the spray mixture than would otherwise be expected based on the coating formulation with no pigment. Therefore, titanium dioxide is a preferred pigment material.

Turning now to a discussion of how to actually carry out the practice of the present invention, reference is made to FIG. 1. An apparatus is shown which is capable of pumping, pressurizing, metering, proportioning, heating, and mixing a coating composition with carbon dioxide to form a liquid mixture comprising the coating composition and compressed carbon dioxide which is present in essentially precisely desired proportions ready for being sprayed. While the following discussion will be focused on carbon dioxide, it is not limited to this material and indeed, any compressed fluid, such as the ones discussed earlier, which are suitable for the particular application desired, may also be utilized.

In particular, carbon dioxide is supplied as a liquid from any suitable source, such as a tank or cylinder which is as denoted as 100 in the drawing. Preferably, the liquid carbon dioxide is supplied on a continuous basis from whatever source is utilized. The liquid carbon dioxide, at its vapor pressure at room temperature (approximately 830 psi) is introduced into a reciprocating pump 110 which in this embodiment is shown as a double-acting piston pump having four check valves.

In the present invention, it has been found that the reciprocating pump used to pump the liquid carbon dioxide is desirably designed for a high feed pressure. The high feed pressure should not cause a change in outlet pressure during a pumping cycle. Liquid carbon dioxide is normally stored in bulk at a temperature of about −18° C. (0°F.) and 300 psi vapor pressure and in a cylinder at room temperature and 830 psi vapor pressure. Accordingly, the feed pressure may vary from 300 to 830 psi, or higher. Some double-acting pump designs (pumps that discharge throughout their cycle and do not stop pumping during the suction part of the cycle) are generally designed for low feed pressures. Consequently, a high feed pressure may affect the forces in the pump and alter the outlet pressure during part of the pumping cycle.

Thus, a typical double-acting three check valve piston pump should preferably not be used for pumping the liquid carbon dioxide. Such a pump has an inlet check valve at the bottom, an outlet check valve at the top, and a check valve situated in the piston head, which allows liquid to flow from the bottom compartment to the top compartment when the piston is moving downward. On the downstroke, the inlet check valve closes, fluid flows from the bottom compartment to the top compartment through the check valve in the piston, and fluid flows out the outlet check valve, because the piston rod, which has half the cross-sectional area of the piston, moves into the pump cylinder and reduces its total volume. When the piston moves upward, the check valve in the piston closes, fluid flows out the outlet check valve from the top compartment, and fluid flows in the inlet check valve and fills the bottom compartment. As a result of such operation, this pump is designed for low feed pressure, typically below 100 psi, so that the outlet pressure on the upstroke and downstroke are nearly the same. If this kind of a pump were operated with a high feed pressure of about 830 psi such as that associated with the liquid carbon dioxide, the outlet pressure on the upstroke would be about 1900 psi higher than the outlet pressure on the downstroke since the inlet feed pressure assists the pumping action on the upstroke but not the downstroke. The pressure increase would be twice the feed pressure due to the piston surface area on the inlet side being twice the piston area on the outlet side.

Accordingly, a double-acting piston pump having four check valves which can accommodate a high feed pressure is particularly suitable in the present invention for pressurizing the liquid carbon dioxide. Both the top and bottom compartments of this type of pump each have an inlet and outlet check valve, respectively. The piston does not have a check valve. The piston rod extends through both ends of the cylinder, with packing at both ends. The pump design and operation is symmetrical in the upstroke and downstroke directions, so that the outlet pressure is the same in both parts of the cycle. When the piston moves upward, fluid flows out the upper outlet check valve and fluid flows in the lower inlet check valve simultaneously. When the piston then moves downward, fluid flow out the lower outlet check valve while fluid flows in the upper inlet check valve.

Pump 110 may be driven by any suitable means. An air motor 112 supplied with air from lines 10, 12 and 14, respectively, may be utilized to give pump-on-demand performance. Desirably, a circulating refrigeration system (not shown) is used to cool pump 110 to help avoid cavitation. The carbon dioxide is generally pumped to a pressure of about 1500 to about 1700 psig and then let down in pressure to the desired spray pressure using a pressure regulator (not shown) for a typical airless spray gun application in which the carbon dioxide is utilized in its subcritical state. Otherwise, the carbon dioxide is generally pumped to a pressure of about 1200 to about 2200 psig (above its critical pressure of approximately 1070 psig) for a typical airless spray gun application if the carbon dioxide is to be used in its supercritical state.

Coating composition is continuously supplied from any suitable source such as a pressure pot 114. Although just one such pot is shown in the drawing, it is understood that a plurality of such pots may be used in series or parallel while others are simultaneously being charged so as to provide the desired continuous flow. The coating composition may first be pumped by a pumping means 116 which in this embodiment is a double-acting three check valve reciprocating piston pump which has been described earlier. An air motor 118 supplied with pressurized air from lines 10, 16 and 18, respectively, may be used to drive the pump. Such a reciprocating pump may be used as a supplementary pump when a very thick, viscous and/or abrasive coating composition is being utilized. Otherwise, the coating composition is pumped directly by precision gear pump 126.

After being pressurized by pump 110, the carbon dioxide passes through a coriolis mass flow meter 120 to measure the mass flow rate in a manner described later with respect to FIG. 2. The measured mass flow rate is sensed by an electronic receiving device 122 which in turn sends out an electronic signal to electronic ratio controller 124, which will be discussed later.

Simultaneously, the coating composition is being fed to precision gear pump 126 which is capable of delivering precise amounts of the coating composition on demand.

The ratio controller 124 contains logic circuitry which can be programmed to accept the electronic signal from device 122 and in turn generates a signal to pump 126 to control its speed. Correspondingly, the amount of coating composition that leaves pump 126 is substantially precisely controlled to a predetermined ratio relative to the amount of carbon dioxide measured by mass flow meter 120. The ratio controller works cooperatively with a microprocessor 128 which also receives the mass flow rate information from receiving device 122 and which can also send information to the ratio controller from a precision gear metering device 130 to which the coating composition passes after being pumped-by gear pump 126.

The flow rate measured by metering device 130 generates a flow feedback signal which is electronically received by the microprocessor 128. The microprocessor compares the actual flow rate that is measured by metering device 130 with the required flow rate needed to provide the desired ratio of coating composition and carbon dioxide based on its preset programming and sends appropriate electronic instructions to the controller 124 to makes any adjustments needed to the speed of pump 126 so as to obtain that required flow rate.

A general purpose Molytek data logger 135 with mathematical capability may be utilized for data printing and calculations pertaining to the stream characteristics. Additionally, due to the burst mode of spraying that may be associated with the admixed liquid composition, a burst mode signal conditioning module 132 is also preferably utilized to permit evaluation of a single short spray burst, or a series or short spray bursts with interruptions.

After passing through the metering device 130, the coating composition is heated if desired by optional heater 134 which desirably is an electric high pressure paint heater in order to reduce its viscosity to aid in the mixing with the carbon dioxide. The coating composition is then preferably filtered in fluid filter 136 to remove particulates and fed through a check valve into mixing manifold 138 where it is joined in just the proper proportion with the carbon dioxide after it too has passed through a check valve and into mixing manifold 138.

After the coating composition and carbon dioxide are accurately proportioned together at the mixing manifold, it then enters into a circulation loop generally denoted as 500 in the drawing. The circulation loop continuously pumps, uniformly mixes, and optionally heats the mixture of coating composition and carbon dioxide such that the carbon dioxide enters and remains well mixed and, moreover, circulates the now admixed liquid mixture of coating composition and subcritical compressed carbon dioxide past a spraying means which is capable of spraying the mixture on demand.

Particularly, once having entered the circulation loop 500, the mixture is generally first further mixed by means of a static mixer 140 which helps provide a more uniform blend. The mixture then passes through optional heater 142 to obtain the desired spray temperature. If the carbon dioxide is to be used in its supercritical state, the mixture is heated to a temperature which is above the critical temperature of carbon dioxide, i.e., approximately 31° C.

The admixed liquid mixture comprised of the coating composition and compressed carbon dioxide is then filtered once again in filter 144 and passes through a Jerguson sight glass 146 which is used to examine the phase condition of the admixed liquid mixture. Circulation flow in the circulation loop is obtained through the use of gear pump 148. A pressure relief valve 150 is desirably provided to protect the system from overpressurization.

By the proper opening and closing of valves, the admixed liquid composition may be passed through a spraying device generally denoted as 600 in the drawing which may be operated manually on an on-demand basis by pulling a trigger on an airless or electrostatic airless spray gun, or automatically by a spray gun mounted on a reciprocator (not shown).

Figure 2:
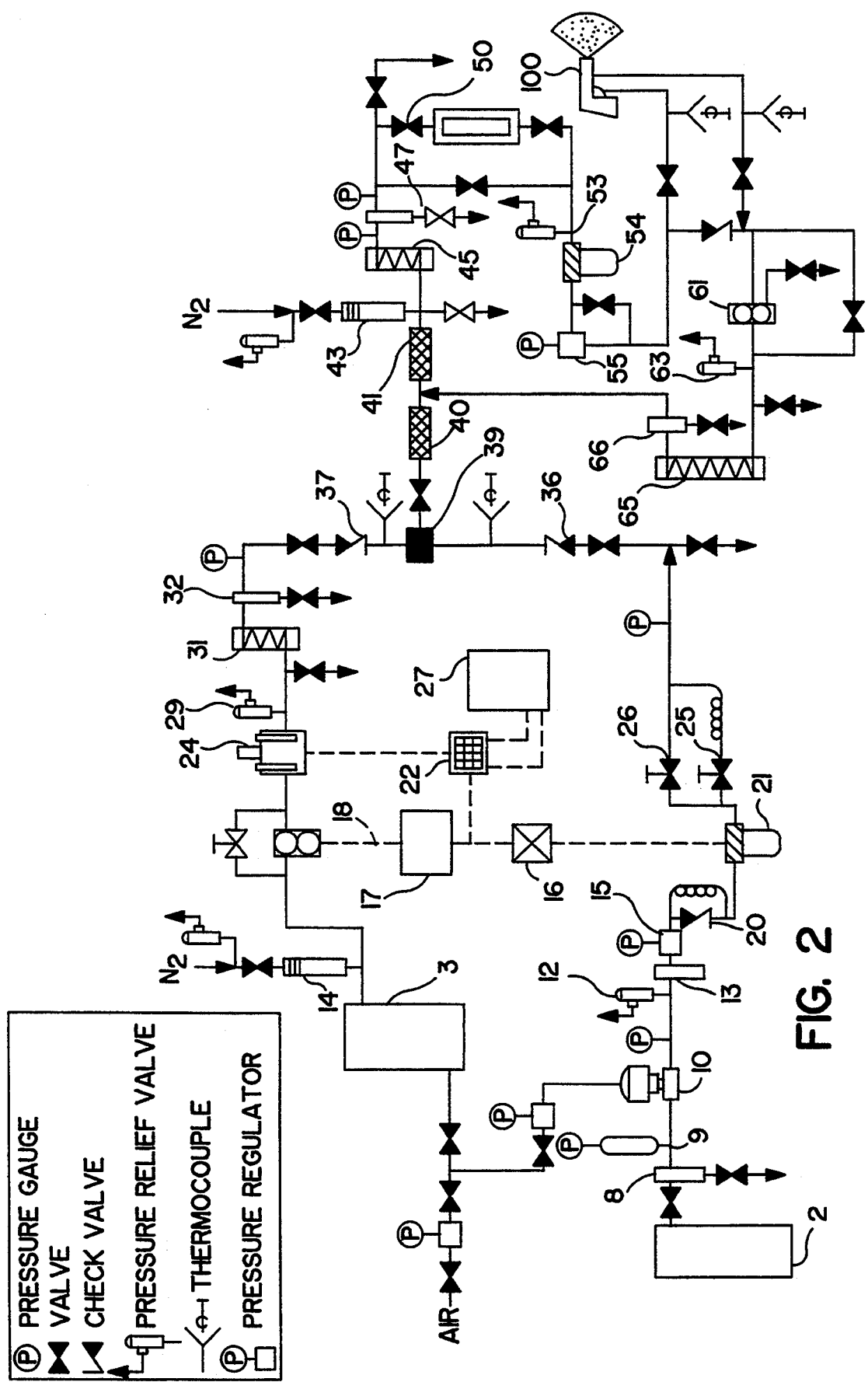
FIG. 2 is a schematic diagram of a more preferred embodiment of the apparatus shown in FIG. 1.

In a more preferred embodiment which is shown in FIG. 2, the carbon dioxide is continuously supplied from a cryogenic carbon dioxide feed system shown generally as 2 in the drawing. The cryogenic carbon dioxide at approximately 300 psig is first fed to an air driven carbon dioxide primer pump (not shown) located at the carbon dioxide feed system 2 (Haskel Inc., Model AGD-1S) for initial pressurization. The feed line in between the carbon dioxide source 2 and the primer pump is preferably insulated and also kept refrigerated by bleeding carbon dioxide (approximately ½ lb/hr) through a coil wrapped around the feed line. Surge tank 9 is provided to help damp flow fluctuations in the feed line. The carbon dioxide now having a pressure of between about 1000 to about 1400 psi, and after being filtered by in-line filter 8, is then pressurized to a pressure of about 1600 to about 2300 psig by a carbon dioxide liquid pump 10 (Haskel Inc., Model 8DSFD-25). This liquid pump is a single-acting pump that utilizes a three-way cycling spool that is designed for pumping liquified gases under pressure without requiring refrigeration to avoid cavitation. If desired, in order to help reduce flow fluctuations which may be caused by the single-acting pump, an accumulator (not shown) such as accumulator 43 or even another surge tank, such as surge tank 9, may be utilized immediately after this pump. Moreover, a double-acting pump having four check valves may alternatively be used, if desired. After passing through disposable in-line filter 13, the pressurized carbon dioxide is then regulated down with a pressure regulator 15 to the desired steady outlet pressure for spraying.

After being pressurized and regulated, carbon dioxide flows through coriolis meter 21 (Micro Motion, Inc., Model 06) for a true mass flow rate measurement. A capillary tube (1 ft × 1/16 in. OD) and a check valve (25 psi) connected in parallel at 20 is installed prior to the coriolis meter to help avoid a large carbon dioxide flow surge and to smooth down the carbon dioxide flow rate when the liquid pump 10 is activated. A Hoke global valve and a capillary tubing (7 ft × 1/16 in. OD) connected in series at 25 is used to control and restrict the carbon dioxide flow during the initial start-up. After the system is pressurized, another Hoke global valve 26 is opened to allow steady carbon dioxide flow for normal operation. A pressure relief valve 12 (Anderson Greenwood) is used to protect the carbon dioxide system from overpressurization.

The coating composition is fed from a coating supply system generally shown as 3 in the drawing. An accumulator 14 using nitrogen is utilized to offset any pressure pulsation. The coating flow rate is metered by a precision gear pump 18 (Zenith, Model HLB-5592). Viscous coating from coating supply system 3 is normally pressurized with a booster pump (not shown) to provide sufficient flow through filters and feed lines to the Zenith metering pump to avoid cavitation. Such a booster pump may include a liquid pump such as a Haskel type pump similar to pump 10. The Zenith pump 18 supplies the positive pressure needed for feeding the coating composition to the recirculation loop. A precision gear meter 24 (AW Co., Model ZHM-02) is used for measuring the flow rate of the coating composition. The speed command of the Zenith pump is electronically controlled by the Zebrive Speed Control System 17 that receives the input signal from the Micro Motion remote electronics unit 16. The coating metering rate is electronically adjusted by coating flow feedback signal received from the gear meter 24. The desired carbon dioxide mass ratio is therefore maintained when the two feeds are combined at the entrance to the circulation loop at manifold 39. As an alternative embodiment, instead of electronically controlling the Zenith pump, the control system 17 may be made to adjust an air drive control valve (not shown) which would regulate an amount of pressurized air that would be available to a pump air drive system which is connected to the pump.

The coating composition flows through optional heater 31 (Binks heater) and a paint filter 32 (Binks paint filter) before it enters the circulation loop. Pressure relief valve 29 (Anderson Greenwood) is used to protect the coating composition system from overpressurization.

A multi-channel flow computer 22 (AW Co., Model EMO-1005) is used for both instantaneous and cumulative flow rate computation/indication. A general purpose Molytek data logger 27 with mathematical capability provides data printing and calculation functions of the characteristics of the two streams.

The coating composition and carbon dioxide are combined at manifold 39 and passed through a static mixer 40 (Binks) before entering the circulation loop. The check valves 36 and 37 prevent back flow of the two fluids. The combined mixture is then again mixed in another static mixer 41 (Binks) in the circulation loop itself. The mixture is optionally heated and controlled to the desired temperature in the circulation loop through two respective sets of optional high pressure heaters 45 and 65, both connected in series. If the carbon dioxide is to be used in its supercritical state, the mixture is generally heated and controlled to a temperature in the range of from about 40° to about 70° C. Once heated to this temperature range, the carbon dioxide enters the supercritical state and remains in that state as it is being circulated and until it is ultimately sprayed. The mixture also flows through two filters 47 and 66 and is circulated in the loop by a gear pump 61 (Zenith, Model HLB-5592). If desired, the circulation return portion of the loop from spraying means 100 to the inlet at mixer 40 may be eliminated if spraying is at ambient temperature and circulation is not desired.

An accumulator 43 (Tobul, Model 4.7A30-4) is used to increase the loop capacity and also used to minimize the pressure pulsation in the loop when spray system 100 is activated. Pressure relief valves 53 and 63 (Anderson Greenwood) are used to protect the loop from overpressurization. A sight glass 50 (Jerguson) is used to view the mixture in the loop and observe its phase. A mass flow meter 54 (Micro Motion Inc., Model D12) is used to monitor the fluid density and flow rate in the circulation loop. The admixed liquid mixture is sprayed onto the substrates from spray system 100.

The following examples are provided to further illustrate this invention.

Glossary of Terms

Gloss retention - This gloss retention is a measure of water resistance. After measuring the 20° spectral gloss, the coated panels were suspended in a 50° C. water bath for 17 hours. They were removed from the bath, dried, and the 20° spectral gloss was remeasured and the percent gloss retention was calculated.

Spot Tests (5 hour) - Spot tests were performed by using 5% hydrochloric acid, 20% sodium hydroxide, bleach, mustard, lipstick, iodine, and ink by placing an approximately one-inch diameter drop on the coating surface and allowing the "spotted" sample to remain uncovered under ambient condition for 5 hours. The test solution was then rinsed away using deionized water or by wiping in the case of solids, and the coating was examined for blushing, blistering, or discoloration.

Double Rubs - Solvent resistance was measured as the number of solvent (methyl ethyl ketone double rubs or acetone double rubs) that were required to cut through the coating. If 100 rubs or more did not cut through the coating, the coating was recorded as >100. To perform the test, the solvent-soaked cloth is rubbed back and forth with hand pressure. A rub back and forth was designated as one "double rub."

Acrylic I - A thermoplastic acrylic polymer for formulation of coatings and marketed by Rohm and Haas Company as AT-954.

Catalyst I - A 40% solution of p-toluenesulfonic acid in methanol.

Melamine I - A polymethoxymethyl melamine sold my Monsanto Company under the tradename CYMEL ® 303.

Surfactant I - A 25% solution of a methoxy-terminated poly(ethylene oxide) modified polydimethylsiloxane in methyl amyl ketone commercially available from Union Carbide Chemicals and Plastics Company Inc. as SILWET ® L-77.

Surfactant II - A 25% solution of a methoxy-terminated ethylene oxide/propylene oxide copolymer modified polydimethylsiloxane in methyl amyl ketone commercially available from Union Carbide Chemicals and Plastics Company Inc. as SILWET ® L-7001.

EXAMPLE 1

A four-necked, one-liter round bottom flask equipped with a mechanical stirrer, thermometer, nitrogen sparging tube, and a simple distillation head was charged with 76.7 grams (0.44 mole) of 2-ethyl-3-propyl-l,5-pentanediol, 5.4 grams (0.040 mole) of trimethylolpropane, 24.9 grams (0.15 mole) of isophthalic acid, 21.9 grams (0.15 mole) of adipic acid, and 0.26 grams (0.2 weight percent) dibutyltin oxide catalyst. The ingredients were kept under a nitrogen sparge with stirring throughout the course of the reaction. The system was heated gradually heated to 160° C. over a one-hour period. The temperature was maintained at 160° C. with a Therm-O-Watch controller for one hour, and then the temperature was increased in 10 degree increments every 45 minutes until a reaction temperature of 220° C. was attained. This temperature was maintained for 30 minutes after which the system was allowed to cool to room temperature. All water of condensation formed by the reaction was removed with the simple distillation head. The resulting polyester had a Brookfield viscosity of 43,600 centipoise at 23° C., an hydroxyl number of 147, and an acid number of 1.79. Molecular weight determination by gel permeation chromatography using a polystyrene standard resulted in an apparent number average molecular weight of 993, a weight-average molecular weight of 2155, and a polydispersity of 2.17.

EXAMPLE 2

A polyester was prepared in the same manner as that of Example 1 except the following ingredients were used: 75.2 grams (0.43 mole) of 2-ethyl-3-propyl-1,5-pentanediol, 3.5 grams (0.026 mole) of trimethylolpropane, 16.2 grams (0.10 mole) of isophthalic acid, 14.3 grams (0.10 mole) of adipic acid, and 0.22 grams (0.2 weight percent) dibutyltin oxide catalyst. The resulting polyester had a Brookfield viscosity of 5,440 centipoise at 23° C., an hydroxyl number of 258, and an acid number of 2.23. Molecular weight determination by gel permeation chromatography using a polystyrene standard resulted in an apparent number average molecular weight of 831, a weight-average molecular weight of 1161, and a polydispersity of 1.40.

Control Examples A through C

In the same manner as described in Example 1, control polyesters were prepared from a five-carbon diol, a six-carbon diol, and a nine-carbon diol. The polyesters had the properties given below.

| Ingredients | Control A 5-Carbon Diol grams | Control A 5-Carbon Diol moles | Control B 6-Carbon Diol grams | Control B 6-Carbon Diol moles | Control C 9-Carbon Diol grams | Control C 9-Carbon Diol moles |
|---|---|---|---|---|---|---|
| 2,2-dimethyl-1,3-propanediol | 206.8 | 1.98 | — | — | — | — |
| 2,2,4-trimethyl-1,3-propanediol | — | — | 289.5 | 1.98 | — | — |
| 2-butyl-2-ethyl-1,3-propanediol | — | — | — | — | 317.3 | 1.98 |
| Trimethylolpropane | 24.2 | 0.18 | 24.2 | 0.18 | 24.2 | 0.18 |
| Isophthalic acid | 112.0 | 0.67 | 112.0 | 0.67 | 112.0 | 0.67 |
| Adipic acid | 98.4 | 0.67 | 98.4 | 0.67 | 98.4 | 0.67 |
| Dibutyltin oxide | 0.88 | — | 0.88 | — | 0.88 | — |
| Properties | | | | | | |
| Viscosity, cp (23° C.) | 314,000 | | 319,000 | | 125,000 | |
| Molecular Weight (GPC) | | | | | | |
| Number average | 910 | | 1124 | | 658 | |
| Weight average | 1548 | | 1964 | | 1415 | |
| Equivalent Weight from Hydroxyl Number | 237 | | 420 | | 280 | |

Although the polyesters of Control Examples A, B and C had apparent molecular weights as determined by gel permeation chromatography similar to the polyesters of Examples 1 and 2, the viscosities of Examples 1 and 2 polyesters were markedly lower than that of the control polyesters. The properties of the coatings made from these polyesters are given in Control Examples E through H which are included with Example 3.

EXAMPLE 3 AND CONTROL EXAMPLES E THROUGH H

These examples describe preparation of thermally curable coatings prepared from a polyester identified in the table below and an aminoplast crosslinking agent. The ingredients list in the table, except for Catalyst I, were placed in a glass container and thoroughly mixed for each example. When they were well mixed, Catalyst I was stirred into the blend. The blended components were allowed to stand under ambient conditions to allow escape of entrapped air. The liquid coating was then applied with a 10-mil wet-clearance film applicator to Bonderite 40 unpolished, cold-rolled steel panels using the draw-down technique. The coated panels were then baked in an air-circulating oven at 140° C. for 30 minutes. The coatings were then tested by the indicated tests and the results of those tests given.

| | Example 3 | Control E | Control F | Control G | Control H |
|---|---|---|---|---|---|
| Ingredients, grams | | | | | |
| Example 1 Polyester | 5.3 | — | — | — | — |
| Control A Polyester | — | 5.3 | — | — | — |
| Control B Polyester | — | — | 5.3 | — | — |
| Control C Polyester | — | — | — | 5.3 | — |
| Control D Polyester | — | — | — | — | — |
| Acrylic I | — | — | — | — | 5.3 |
| Melamine I | 2.3 | 2.3 | 2.3 | 2.3 | 2.3 |
| Methyl amyl ketone | 2.5 | 2.5 | 2.5 | 2.5 | 2.5 |
| Surfactant I | 0.16 | 0.16 | 0.16 | 0.16 | 0.16 |
| Surfactant II | 0.16 | 0.16 | 0.16 | 0.16 | 0.16 |
| Catalyst I | 0.06 | 0.06 | 0.06 | 0.06 | 0.06 |
| Cured Film Properties | | | | | |
| Cured Film Thickness, mils | 2.0 | 2.0 | 2.3 | 1.7 | 1.4 |
| Specular Gloss (20°) (ASTM D523-78) | 91.5 | 91.5 | 95.0 | 90.0 | 89.4 |
| Specular Gloss (60°) (ASTM D523-78) | 100.4 | 101.6 | 102.0 | 99.4 | 100.2 |
| Pencil Hardness (ASTM D3363-74) | 4H | F | 2H | F | 4H |
| Impact Resistance (ASTM D2794-84) | | | | | |
| Forward, in-lbs | 150 | 160 | 150 | 120 | 30 |
| Reverse, in-lbs | 120 | 50 | 20 | 40 | 5 |
| Gloss Retention, 20°, % | 100 | 99 | 96.7 | — | 100 |
| Methyl ethyl ketone double rubs | >100 | >100 | >100 | >100 | >100 |
| Spot Tests (5 hour)* | | | | | |
| 5% Hydrochloric Acid | NE | NE | NE | — | — |
| 20% Sodium Hydroxide | NE | NE | NE | — | — |
| Bleach | NE | NE | NE | — | — |
| Ink | NE | NE | NE | — | — |
| Lipstick | NE | NE | NE | — | — |
| Mustard | SE | NE | NE | — | — |
| Iodine | SVE | SE | SE | — | — |

*NE = No Effect; SE = Slight Effect; SVE = Severe Effect

Thus, the coating of Example 3 has an excellent combination of hardness and both forward and reverse impact resistance along with excellent resistance to acid, base, bleach, ink and lipstick, high gloss and gloss retention when immersed in hot water relative to the coatings prepared from the control polyesters.

EXAMPLE 4

The Control A polyester resin made from the 5-Carbon diol, the Control B polyester resin made from the 6-Carbon diol and the Control C polyester resin made from the 9-Carbon diol in accordance with the above-noted control examples were further compared with the polyester resins made from the 10-Carbon diol from Example 1 as to viscosity and, most importantly, carbon dioxide compatibility. The results are as follows:

| Properties* | Control A | Control B | Control C | C10 Diol Resin |
|---|---|---|---|---|
| Viscosity (cps) at 23° C. before CO2 admixture | 314,000 | 319,000 | 125,000 | 43,000 |
| CO2 Compatibility (%) at 1600 psi and 60° C. | 22.4 | 21.3 | 20.7 | 23.4 |

*The properties for all of the polyester resins are based on 100 percent solids. After the addition of the carbon dioxide, the viscosity of each of the resins was less than 50 cps at 1600 psi and 60° C.

From the above table, it is clear that the liquid polyester resin prepared from the C-10 diol (2-ethyl-3-propyl-1,5-pentanediol) in accordance with the present invention, has extremely desirable properties of low viscosity, even at 100% solids, and relative high carbon dioxide compatibility. Thus, it has a viscosity even before being mixed with a compressed fluid of only 43,600 cps. This low viscosity of only 43,600 cps in contrast to the viscosities of 314,000 cps, 319,000 cps and 125,000 cps for the 5-carbon diol polyester, the 6-carbon diol polyester and the 9-carbon diol polyester, respectively, is indeed striking. Moreover, in addition to such low viscosity characteristics, the polyester resin prepared from the 10-Carbon diol also possesses high carbon dioxide compatibility than the control examples. As discussed earlier, these properties allow for a higher solids content to be utilized in the coating formulation and for the use of very little, if any active solvent.

EXAMPLE 5

The apparatus for continuously mixing compressible carbon dioxide fluid with coating formulation shown in the schematic diagram of FIG. 1 is used to spray a coating formulation prepared as in Example 3 using the polyester resin made in Example 1 with the exception being that no methyl amyl ketone is used. The formulation has a viscosity of 32,000 cps (at 25°C.). Carbon dioxide is used as the viscosity reducing diluent. The coating formulation is pressurized to about 1600 psig and metered by a precision gear pump in response to the measured mass flow rate of carbon dioxide to give 28% by weight of carbon dioxide in the liquid mixture. The liquid mixture is then circulated around the circulation loop at high flow rate and heated to a temperature of about 60° C. The liquid mixture now having a viscosity of 40 cps (at 60°C.) is sprayed and a large number of metal panels are coated with the coating formulation.

EXAMPLE 6

A coating formulation prepared as in Example 3 is made except that the polyester resin of Example 2 is used with the exception being that no methyl amyl ketone is used. The apparatus for continuously mixing compressible carbon dioxide fluid with coating formulation shown in the schematic diagram of FIG. 2 is used to spray the coating formulation. The formulation has an initial viscosity of 5,000 cps (at 25°C.). Subcritical carbon dioxide is used as the viscosity reducing diluent. The coating formulation is pressurized to about 900 psig and metered by a precision gear pump in response to the measured mass flow rate of carbon dioxide to give 28% by weight of carbon dioxide in the liquid mixture. The liquid mixture is then circulated around the circulation loop at high flow rate and heated to a temperature of about 28° C. At this temperature, compressed carbon dioxide has a vapor pressure of 995 psi and has equilibrium gas and liquid densities of 0.28 and 0.65 g/cc, respectively. The spray mixture was close to the carbon dioxide solubility limit at these conditions. The liquid mixture now having a viscosity of 50 cps (at 28°C.) is sprayed and a large number of metal panels are coated with the coating formulation.

What is claimed is:

1. A process for reducing the viscosity of a composition containing one or more polyesters comprising forming a liquid mixture in a closed system comprising:
    a) a composition containing at least one or more polyesters comprising the reaction product of (i) a liquid hydrocarbon diol comprised of primary hydroxyl groups of 8 or more carbon atoms in which the primary hydroxyl groups are separated by 4 or more carbon atoms linearly arranged and in which at least one of said carbon atoms linearly arranged is a disubstituted carbon atom or at least 2 of said carbon atoms linearly arranged are monosubstituted carbon atoms, said liquid hydrocarbon diol represented by the formula:

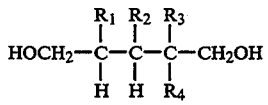

wherein $R_1$ is hydrogen or linear or branched alkyl having from 1 to 3 carbon atoms, and $R_2$, $R_3$ and $R_4$ are the same or different and are hydrogen or linear or branched alkyl having from 1 to 4 carbon atoms, said liquid hydrocarbon diol existing as a liquid at a temperature of 35° C. or less, and/or a derivative of said liquid hydrocarbon diol, provided when said polyester is an unsaturated polyester, then said liquid hydrocarbon diol is other than 2,4-diethyl-3-propyl-1,5-pentanediol, and (ii) a polyfunctional carboxylic acid and/or an acid anhydride; and
    b) at least one compressed fluid in at least an amount which when added to (a) is sufficient to render the viscosity of said mixture less than about 10,000 centipoise, wherein the compressed fluid is a gas at standard conditions of 0° C. and one atmosphere (STP).

2. A process for the liquid spray application of coatings to a substrate containing one or more polyesters which comprises:
    a) forming a liquid mixture in a closed system, said liquid mixture comprising:
        i) at least one or more polyesters comprising the reaction product of (i) a liquid hydrocarbon diol comprised of primary hydroxyl groups and 8 or more carbon atoms in which the primary hydroxyl groups are separated by 4 or more carbon atoms linearly arranged and in which at least one of said carbon atoms linearly arranged is a disubstituted carbon atom or at least 2 of said carbon atoms linearly arranged are monosubstituted carbon atoms, said liquid hydrocarbon diol represented by the formula:

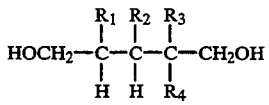

wherein R$_1$ is hydrogen or linear or branched alkyl having from 1 to 3 carbon atoms, and R$_2$, R$_3$ and R$_4$ are the same or different and are hydrogen or linear or branched alkyl having from 1 to 4 carbon atoms, said liquid hydrocarbon diol existing as a liquid at a temperature of 35° C. or less, and/or a derivative of said liquid hydrocarbon diol, provided when said polyester is an unsaturated polyester, then said liquid hydrocarbon diol is other than 2,4-diethyl-3-propyl-1,5-pentanediol, and (ii) a polyfunctional carboxylic acid and/or an acid anhydride; and ii) at least one compressed fluid in at least an amount which when added to (i) is sufficient to render the viscosity of said mixture less than about 150 centipoise, wherein the compressed fluid is a gas at standard conditions of 0° C. and one atmosphere (STP); and b) spraying said liquid mixture onto a substrate to form a liquid coating thereon.

3. The process of claims 1 or 2 wherein the liquid hydrocarbon diol is represented by the formula:

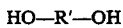

HO—R'—OH wherein R' is a substituted hydrocarbon residue having 8 or more carbon atoms in which the primary hydroxyl groups are separated by 4 or more carbon atoms linearly arranged and in which at least one of said carbon atoms linearly arranged is a disubstituted carbon atom or at least 2 of said carbon atoms linearly arranged are monosubstituted carbon atoms.

4. The process of claims 1 or 2 wherein the liquid hydrocarbon diol is represented by the formula:

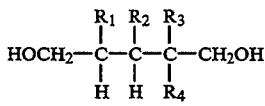

wherein R$_1$ is hydrogen or linear or branched alkyl having from 1 to 3 carbon atoms, and R$_2$, R$_3$ and R$_4$ are the same or different and are hydrogen or linear or branched alkyl having from 1 to 4 carbon atoms; provided (a) at least 2 of R$_1$, R$_2$, R$_3$ and R$_4$ are other than hydrogen; (b) the total number of carbon atoms in R$_1$, R$_2$, R$_3$ and R$_4$ together is 5 or more except as follows: (i) when R$_2$ is ethyl and one of R$_1$, R$_3$ and R$_4$ is methyl, then the remaining 2 of R$_1$, R$_3$ and R$_4$ can be hydrogen; (ii) when R$_3$ and R$_4$ are independently methyl and propyl, then R$_1$ and R$_2$ can be hydrogen; and (iii) when R$_1$ is methyl and R$_2$ is ethyl and one of R$_3$ and R$_4$ is methyl, then the remaining R$_3$ or R$_4$ can be hydrogen; (c) when the total number of carbon atoms in R$_1$ and R$_2$ is 4 or more, then the total number of carbon atoms in R$_2$ is 3 or less except when R$_1$ is propyl and R$_3$ and R$_4$ are hydrogen, then R$_2$ can be butyl; and (d) when R$_1$ is ethyl and R$_2$ is propyl, then R$_3$ is other than ethyl.

5. The process of claims 1 or 2 in which the liquid hydrocarbon diol is selected from 3-ethyl-2-methyl-1,5-pentanediol, 2-ethyl-3-propyl -1,5-pentanediol, 2,4-dimethyl-3-ethyl-1,5-pentanediol, 2-ethyl-4-methyl-3-propyl-1,5-pentanediol, 2,3-diethyl-4-methyl-1,5-pentanediol, 3-ethyl-2,2,4-trimethyl-1,5-pentanediol, 2,2-dimethyl-4-ethyl-3-propyl-1,5-pentanediol, 2-methyl-2-propyl-1,5-pentanediol, 2,4-dimethyl -3-ethyl-2-propyl-1,5-pentanediol, 2,3-dipropyl-4-ethyl-2-methyl-1,5-pentanediol, 2-butyl-2-ethyl -1,5-pentanediol, 2-butyl-2,3-diethyl-4-methyl -1,5-pentanediol, 2-butyl-2,4-diethyl-3-propyl-1,5-pentanediol, 3-butyl-2-propyl-1,5-pentanediol, and mixtures thereof.

6. The process of claims 1 or 2 in which the liquid hydrocarbon diol is 2-ethyl-3-propyl-1,5-pentanediol.

7. The process of claims 1 or 2 wherein the polyfunctional carboxylic acid comprises an aliphatic dicarboxylic acid, an aromatic dicarboxylic acid or mixtures thereof.

8. The process of claims 1 or 2 wherein the polyfunctional carboxylic acid is selected from oxalic acid, malonic acid, succinic acid, glutaric acid, adipic acid, pimelic acid, suberic acid, azelaic acid, sebacic acid, undecanedioic acid, dodecanedioic acid, tridecanedioic acid, maleic acid, fumaric acid, 2-methyl-cis-2-butenedioic acid, 2-methylenesuccinic acid, 1,1-cyclobutanedicarboxylic acid, norcamphoric acid, tetrahydrophthalic acid, methyl-tetra-hydrophthalic acid, 1,1-cyclohexanedicarboxylic acid, hexahydrophthalic acid, 1,4-cyclohexanedicarboxylic acid, chlorendic acid, 1,4-benzenediacetic acid, phthalic acid, isophthalic acid, trimellitic acid, and mixtures thereof.

9. The process of claims 1 or 2 wherein the acid anhydride is selected from trimellitic anhydride, tetrahydrophthalic anhydride, phthalic anhydride, isophthalic anhydride, benzophenone dicarboxylic acid anhydride, succinic anhydride, glutaric anhydride, napthoic anhydride, clorendic anhydride, maleic anhydride or mixtures thereof.

10. The process of claims 1 or 2 wherein the compressed fluid has a solubility of at least 10% by weight based on the total weight of liquid mixture formed.

11. The process of claims 1 or 2 wherein the viscosity of the liquid mixture is less than 150 centipoise at the conditions of the compressed fluid.

12. The process of claims 1 or 2 wherein the at least one compressed fluid comprises carbon dioxide.

13. The process of claims 1 or 2 wherein the at least one compressed fluid comprises a mixture of carbon dioxide and nitrous oxide.

14. The process of claims 1 or 2 wherein the liquid mixture is formed at temperatures such that the compressed fluid has a ratio of gas density to liquid density at equilibrium at such temperatures which is greater than about 0.1.

* * * * *